US011435761B1

(12) United States Patent
Wiegman

(10) Patent No.: US 11,435,761 B1
(45) Date of Patent: Sep. 6, 2022

(54) SYSTEM AND METHOD FOR DISTRIBUTED FLIGHT CONTROL SYSTEM FOR AN ELECTRIC VEHICLE

(71) Applicant: BETA AIR, LLC, South Burlington, VT (US)

(72) Inventor: Herman Wiegman, Essex Junction, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/383,629

(22) Filed: Jul. 23, 2021

(51) Int. Cl.
| | | |
|---|---|---|
| *G05D 1/08* | (2006.01) | |
| *B64C 13/50* | (2006.01) | |
| *B64C 29/00* | (2006.01) | |
| *B64D 27/24* | (2006.01) | |
| *G05D 1/00* | (2006.01) | |
| G06N 20/00 | (2019.01) | |
| B64D 45/00 | (2006.01) | |

(52) U.S. Cl.
CPC ......... *G05D 1/0858* (2013.01); *B64C 13/503* (2013.01); *B64C 13/505* (2018.01); *B64C 29/0033* (2013.01); *B64D 27/24* (2013.01); *G05D 1/0077* (2013.01); *G05D 1/0825* (2013.01); *B64D 2045/0085* (2013.01); *G06N 20/00* (2019.01)

(58) Field of Classification Search
CPC .. G05D 1/0077; G05D 1/0088; G05D 1/0808; G05D 1/0858; G05D 1/101; G05D 1/102; B64C 13/505; B64C 13/503; B64C 2201/042; G05B 9/03; G05B 2219/24182; G05B 2219/24185–24192; B64D 27/24
See application file for complete search history.

(56) References Cited

U.S. PATENT DOCUMENTS

| | | |
|---|---|---|
| 4,472,780 A | 9/1984 | Chenoweth |
| 4,649,484 A | 3/1987 | Herzog |

(Continued)

OTHER PUBLICATIONS

Yeh, Y.C. (Bob), "Triple triple redundant 777 primary flight computer", 1996 IEEE Aerospace Applications Conference Proceedings, Feb. 10, 1996, pp. 293-307 (Year: 1996).*

(Continued)

*Primary Examiner* — David A Testardi
(74) *Attorney, Agent, or Firm* — Caldwell Intellectual Property Law

(57) ABSTRACT

A system and method for distributed flight control configured for use in an electric vehicle wherein the system includes a flight control assembly which further includes at least a sensor electronically connected to the flight control assembly. The sensor is configured to capture at least an input datum, and at least a performance datum. The system further includes a plurality of modular flight controllers communicatively coupled to at least an actuator of a plurality of actuators, wherein each modular flight controller of the plurality of modular flight controllers is configured to the multitude of data from at least a sensor, generate an attitude control datum, determine at least an actuator instruction datum, and perform a control allocation configured for the at least a actuator from the plurality of actuators to follow as a function of the flight control assembly.

19 Claims, 9 Drawing Sheets

(56) References Cited

U.S. PATENT DOCUMENTS

| | | | |
|---|---|---|---|
| 5,115,996 A * | 5/1992 | Moller | B64C 29/0025 239/265.19 |
| 5,493,497 A | 2/1996 | Buus | |
| 6,236,914 B1 | 5/2001 | Kaloust | |
| 7,248,009 B1 | 7/2007 | Sundquist | |
| 7,708,229 B1 | 11/2010 | Yount | |
| 8,033,509 B2 | 10/2011 | Yount | |
| 9,977,432 B1 * | 5/2018 | Cutler | G05D 1/085 |
| 10,423,158 B1 * | 9/2019 | Hadlich | G07C 5/0816 |
| 10,901,434 B2 * | 1/2021 | Cutler | G05D 1/0808 |
| 11,065,979 B1 * | 7/2021 | Demont | B60L 50/64 |
| 11,079,737 B1 * | 8/2021 | Gruenwald | G05B 19/4083 |
| 11,225,321 B1 * | 1/2022 | Townsend | B64C 29/0025 |
| 2004/0026563 A1 * | 2/2004 | Moller | B64C 3/56 244/12.4 |
| 2004/0098140 A1 | 5/2004 | Hess | |
| 2006/0043242 A1 | 3/2006 | Benson | |
| 2007/0007385 A1 | 1/2007 | Potter | |
| 2007/0008673 A1 | 1/2007 | Finley | |
| 2007/0153433 A1 | 7/2007 | Sundquist | |
| 2008/0203224 A1 | 8/2008 | Yount | |
| 2009/0018703 A1 | 1/2009 | Mangalam | |
| 2009/0152404 A1 | 6/2009 | Yount | |
| 2009/0299551 A1 | 12/2009 | So | |
| 2010/0292871 A1 | 11/2010 | Schultz | |
| 2011/0180656 A1 | 7/2011 | Shue | |
| 2012/0056040 A1 * | 3/2012 | Brotherton-Ratcliffe | B64D 27/10 244/23 A |
| 2012/0065881 A1 | 3/2012 | Mciver | |
| 2012/0179368 A1 | 7/2012 | Walter | |
| 2012/0253564 A1 * | 10/2012 | Noll | G01C 23/00 701/14 |
| 2012/0290153 A1 | 11/2012 | Osloe | |
| 2013/0306787 A1 | 11/2013 | Morton | |
| 2013/0311006 A1 * | 11/2013 | Ahmad | G05D 1/0077 701/3 |
| 2014/0288731 A1 | 9/2014 | Hagerott | |
| 2015/0160658 A1 | 6/2015 | Reedman | |
| 2016/0023755 A1 * | 1/2016 | Elshafei | G08G 5/025 244/17.13 |
| 2016/0200421 A1 * | 7/2016 | Morrison | G05D 1/0077 244/17.23 |
| 2016/0246304 A1 | 8/2016 | Canoy | |
| 2017/0217584 A1 * | 8/2017 | Elfeky | G05D 1/0858 |
| 2018/0239366 A1 * | 8/2018 | Cutler | B64C 13/503 |
| 2018/0265190 A1 * | 9/2018 | Fortenbaugh | B64C 27/605 |
| 2019/0265729 A1 * | 8/2019 | Gillett | B64C 13/503 |
| 2019/0334741 A1 * | 10/2019 | Dormiani | B64C 39/024 |
| 2020/0092052 A1 * | 3/2020 | MacAfee | H04L 12/10 |
| 2020/0140079 A1 * | 5/2020 | Campbell | B64C 39/024 |
| 2020/0201359 A1 * | 6/2020 | Burghardt | G01C 23/005 |
| 2020/0262544 A1 * | 8/2020 | Wilkens | G06F 13/4295 |
| 2021/0165425 A1 * | 6/2021 | Cutler | B64D 31/06 |
| 2021/0171187 A1 * | 6/2021 | Keir | B64C 13/505 |
| 2021/0253263 A1 * | 8/2021 | Wheeler | B64D 31/12 |
| 2021/0262399 A1 * | 8/2021 | Thorup | G05D 1/0808 |

OTHER PUBLICATIONS

Mirk, David et al., "Towards Single-Failure-Tolerant Multicopters", DroNet'16, Proceedings of the 2nd Workshop on Micro Aerial Vehicle Networks, Systems, and Applications for Civilian Use, Jun. 26, 2016, Singapore, Singapore, pp. 5-10. (Year: 2016).*

Zhang, Xunying et al., "Architecture Design of Distributed Redundant Flight Control Computer Based on Time-Triggered Buses for UAVs", IEEE Sensors Journal, vol. 21, No. 3, Feb. 1, 2021, pp. 3944-3954 (Year: 2021).*

* cited by examiner

SYSTEM AND METHOD FOR DISTRIBUTED FLIGHT CONTROL SYSTEM FOR AN ELECTRIC VEHICLE

FIELD OF THE INVENTION

The present invention generally relates to the field of flight control. In particular, the present invention is directed to a system and method for distributed flight control system for an electric vehicle.

BACKGROUND

Automated control is indispensable in operating an electric vehicle. Safety of an automated electric vehicle such as an electric aircraft is critical. Flight control system or autopilot program is paramount in operating an electric vehicle safely. An automated flight control system may require a form of redundancy to safeguard against failures. However, building redundancy in automated flight control systems may be complex or costly. In electrically propelled vehicles, such as an electric vertical takeoff and landing (eVTOL) aircraft, it is essential to maintain the integrity of the aircraft at the lift off of the aircraft, flight of the aircraft, and the landing of the aircraft. In some flights, an actuator of the aircraft may experience a malfunction or failure which will put the aircraft in an unsafe mode which will compromise the safety of the aircraft, passengers and onboard cargo. A pilot must be aware of multitude of actuators to control to follow a flight path and optimally.

SUMMARY OF THE DISCLOSURE

In an aspect, a system for distributed flight control configured for use in an electric vehicle is provided. The system includes a flight control assembly, wherein the flight control assembly further includes at least a sensor electronically connected to the flight control assembly. The sensor is configured to capture at least an input datum, at least an optimal flight plan datum, and at least a performance datum. The system further includes a plurality of modular flight controllers communicatively coupled to at least an actuator of a plurality of actuators, wherein each modular flight controller of the plurality of modular flight controllers is configured to receive at least an input datum, at least an optimal flight plan datum, and at least a performance datum from at least a sensor, generate an attitude control datum as a function of the at least an input datum, the at least an optimal flight plan datum, and the at least a performance datum, determine at least an actuator instruction datum as a function of the attitude control datum, and perform a control allocation configured for the at least a actuator from the plurality of actuators to follow as a function of the flight control assembly.

In another aspect a method for distributed flight control configured for use in an electric vehicle is provided. The method includes capturing, by at least a sensor, at least an input datum, at least an optimal flight plan datum, and at least a performance datum, receiving, by at least a modular flight controller from a flight control assembly, at least an input datum, at least an optimal flight plan datum, and at least a performance datum from at least a sensor, generating an attitude control datum as a function of the at least an input datum, the at least an optimal flight plan datum, and the at least a performance datum, determining at least an actuator instruction datum as a function of the attitude control datum, and performing a control allocation configured for the at least a actuator from the plurality of actuators to follow as a function of the flight control assembly.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
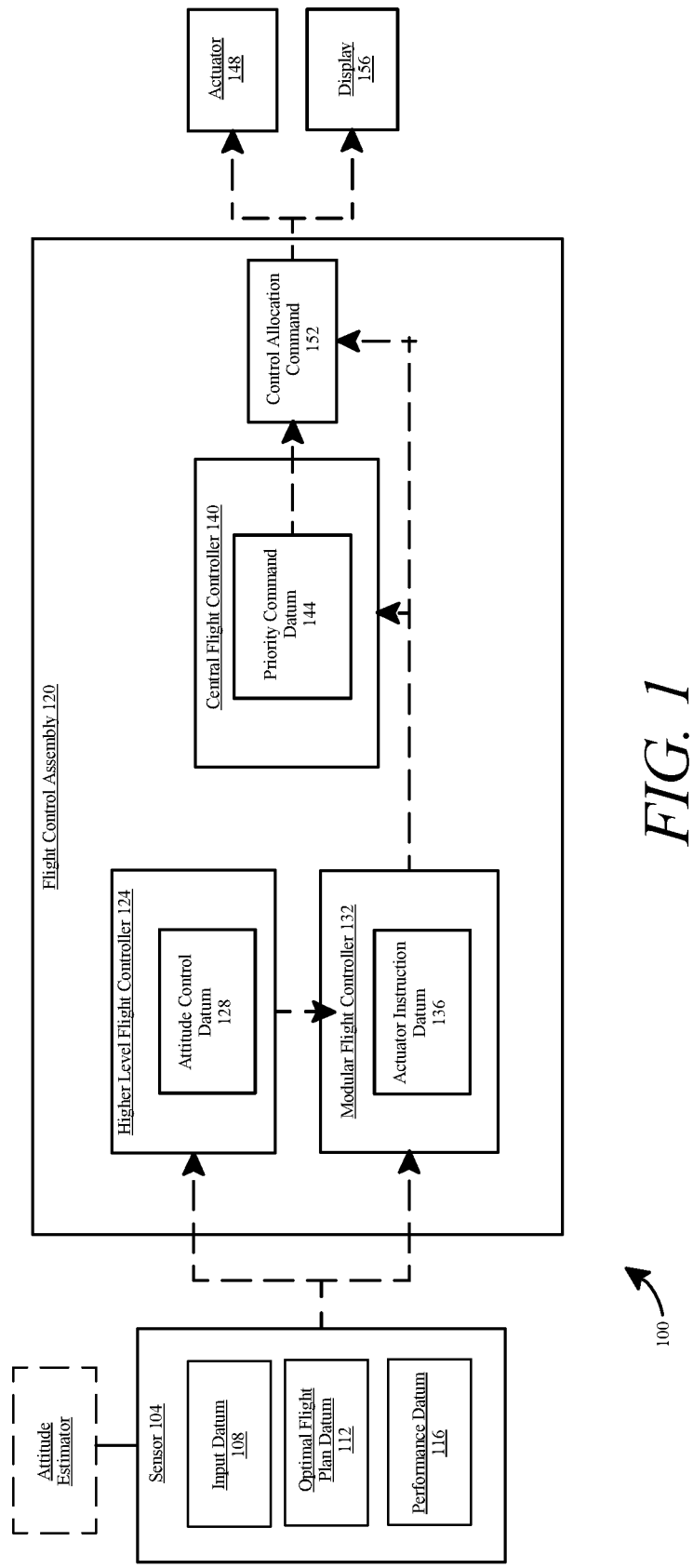
FIG. 1 is an illustrative embodiment of a system for a flight control assembly configured for use in embodiments of the present invention.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to systems and methods for a distributed flight control system. In an embodiment, the distributed flight control system can be configured for use in an electric vehicle such as an electric vertical take-off and landing (eVTOL) aircraft. The system may include a flight control assembly and one or more sensors configured to detect or capture external and aircraft quantities such as input datum, optimal flight plan datum, and a performance datum. Each quantity may be captured as a function of an outside parameter. The system further includes a plurality of modular flight controllers, and the one or more sensors may be connected to the flight assembly and/or one or more modular flight controllers mechanically or electronically. The system includes each modular flight controller to be electronically connected to one or more actuators or a set of actuators. Each modular flight controller is configured to receive the external and aircraft quantities mentioned previously as inputs from at least a sensor, generate an attitude control datum from those inputs, determine at least an actuator instruction datum, and perform a control allocation configured for one or more actuators.

Aspects of the present disclosure can be used for automated flight. The flight control assembly may consider various external factors and generate a command for an electric vehicle's actuators to follow to achieve flight based on the various external factors and a priority. The pilot of the electric vehicle may transmit a pilot input to choose a priority for the flight assembly to generate a command in consideration of the pilot input. Aspects of the present disclosure can also be used to generate a command for electric vehicle actuators to follow to a flight path that is prioritized to achieve optimal flight, shortest path, safest path, and the like.

Aspects of the present disclosure also allow for an efficient way of forming redundancy within a flight control assembly to safeguard against failures of any electric vehicle component or flight assembly itself. The distributed flight control system of the flight assembly may be configured with a degree of automation and artificial intelligence (AI). The flight control assembly allows for a pilot to control less of the complex individual components of the electric vehicle as the flight control assembly, with some level of auto-pilot software, can serve as the central hub for instructing electric vehicle components. Exemplary embodiments illustrating aspects of the present disclosure are described below in the context of several specific examples.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to embodiments oriented as shown for exemplary purposes in FIG. 6. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Now referring to FIG. 1, an exemplary embodiment of a distributed flight control system 100 configured for use in embodiments of the present invention is presented. Distributed flight control system 100 includes a flight control assembly 120. Any component of distributed flight control system 100 and/or flight control assembly 120 may include any computing device and/or set of computing devices as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. Distributed flight control system 100 may include a single computing device operating independently, or may include two or more computing device operating in concert, in parallel, sequentially or the like; two or more computing devices may be included together in a single computing device or in two or more computing devices. Distributed flight control system 100 may interface or communicate with one or more additional devices as described below in further detail via a network interface device. Network interface device may be utilized for connecting distributed flight control system 100 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Distributed flight control system 100 may include but is not limited to, for example, a computing device or cluster of computing devices in a first location and a second computing device or cluster of computing devices in a second location. Distributed flight control system 100 may include one or more computing devices dedicated to data storage, security, distribution of traffic for load balancing, and the like. Distributed flight control system 100 may distribute one or more computing tasks as described below across a plurality of computing devices of computing device, which may operate in parallel, in series, redundantly, or in any other manner used for distribution of tasks or memory between computing devices. Distributed flight control system 100 may be implemented using a "shared nothing" architecture in which data is cached at the worker, in an embodiment, this may enable scalability of the distributed flight control system 100 and/or computing device.

With continued reference to FIG. 1, the distributed flight control system 100 may be designed and/or configured to perform any method, method step, or sequence of method steps in any embodiment described in this disclosure, in any order and with any degree of repetition. For instance, the distributed flight control system 100 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Distributed flight control system 100 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, the distributed flight control system 100 and/or flight control assembly may be controlled by one or more Proportional-Integral-Derivative (PID) algorithms driven, for instance and without limitation by stick, rudder and/or thrust control lever with analog to digital conversion for fly by wire as described herein and related applications incorporated herein by reference. A "PID controller", for the purposes of this disclosure, is a control loop mechanism employing feedback that calculates an error value as the difference between a desired setpoint and a measured process variable and applies a correction based on proportional, integral, and derivative terms; integral and derivative terms may be generated, respectively, using analog integrators and differentiators constructed with operational amplifiers and/or digital integrators and differentiators, as a non-limiting example. A similar philosophy to attachment of flight control systems to sticks or other manual controls via pushrods and wire may be employed except the conventional surface servos, steppers, or other electromechanical actuator components may be connected to the cockpit inceptors via electrical wires. Fly-by-wire systems may be beneficial when considering the physical size of the aircraft, utility of for fly by wire for quad lift control and may be used for remote and autonomous use, consistent with the entirety of this disclosure. Distributed flight control system 100 may harmonize vehicle flight dynamics with best handling qualities utilizing the minimum amount of complexity whether it be additional modes, augmentation, or external sensors as described herein.

With continued reference to FIG. 1, distributed flight control system 100 includes at least a sensor 104. At least a sensor 104 may be mechanically and/or communicatively connected a flight control assembly 120. At least a sensor 104 may be mechanically and/or electronically coupled to at least an actuator 148 or set of actuators. At least a sensor 104 may include a sensor suite which may include a plurality of individual sensors. At least a sensor 104 is configured to detect or capture at least an input datum 108, at least an optimal flight plan datum 112, and at least a performance datum 116. "Sensor," for the purposes of this disclosure, refer to a computing device configured to detect, capture, measure, or combination thereof, a plurality of external and electric vehicle component quantities. At least a sensor 104 may be integrated and/or connected to at least an actuator, a portion thereof, or any subcomponent thereof. At least a sensor 104 may include circuitry or electronic components configured to digitize, transform, or otherwise manipulate electrical signals. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. The plurality of datum captured by at least a sensor 104 may include circuitry, computing devices, electronic components or a combination thereof that translates into at least an electronic signal configured to be transmitted to another electronic component.

With continued reference to FIG. 1, at least a sensor 104 may include a motion sensor. A "motion sensor", for the purposes of this disclosure is a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor 104 may include, but not limited to, torque sensor, gyroscope, accelerometer, magnetometer, inertial measurement unit (IMU), pressure sensor, force sensor, proximity sensor, displacement sensor, vibration sensor, LIDAR sensor, and the like. In a non-limiting embodiment at least a sensor 104 ranges may include a technique for the measuring of distances or slant range from an observer including at least a sensor 104 to a target which may include a plurality of outside parameters. "Outside parameter," for the purposes of this disclosure, refer to environmental factors or physical electric vehicle factors including health status that may be further be captured by a sensor 104. Outside parameter may include, but not limited to air density, air speed, true airspeed, relative airspeed, temperature, humidity level, and weather conditions, among others. Outside parameter may include velocity and/or speed in a plurality of ranges and direction such as vertical speed, horizontal speed, changes in angle or rates of change in angles like pitch rate, roll rate, yaw rate, or a combination thereof, among others. Outside parameter may further include physical factors of the components of the electric aircraft itself including, but not limited to, remaining fuel or battery. Outside parameter 108 may include at least an environmental parameter. Environmental parameter may be any environmentally based performance parameter as disclosed herein. Environment parameter may include, without limitation, time, pressure, temperature, air density, altitude, gravity, humidity level, airspeed, angle of attack, and debris, among others. Environmental parameters may be stored in any suitable datastore consistent with this disclosure. Environmental parameters may include latitude and longitude, as well as any other environmental condition that may affect the landing of an electric aircraft. Technique may include the use of active range finding methods which may include, but not limited to, light detection and ranging (LIDAR), radar, sonar, ultrasonic range finding, and the like. In a non-limiting embodiment, at least sensor 104 may include at least a LIDAR system to measure ranges including variable distances from the at least a sensor 104 to a potential landing zone or flight path. LIDAR systems may include, but not limited to, a laser, at least a phased array, at least a microelectromechanical machine, at least a scanner and/or optic, a photodetector, a specialized GPS receiver, and the like. In a non-limiting embodiment, at least sensor 104 including a LIDAR system may target an object with a laser and measure the time for at least a reflected light to return to the LIDAR system. LIDAR may also be used to make digital 4-D representations of areas on the earth's surface and ocean bottom, due to differences in laser return times, and by varying laser wavelengths. In a non-limiting embodiment the LIDAR system may include a topographic LIDAR and a bathymetric LIDAR, wherein the topographic LIDAR that may use near-infrared laser to map a plot of a land or surface representing a potential landing zone or potential flight path while the bathymetric LIDAR may use water-penetrating green light to measure seafloor and various water level elevations within and/or surrounding the potential landing zone. In a non-limiting embodiment, electric aircraft may use at least a LIDAR system as a means of obstacle detection and avoidance to navigate safely through environments to reach a potential landing zone. At least a sensor 104 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor.

With continued reference to FIG. 1, distributed flight control system 100 may include at least a sensor 104 which may further include a sensor suite. One or more sensors may be communicatively connected to at least a pilot control, the manipulation of which, may constitute at least an aircraft command. "Communicatively connected", for the purposes of this disclosure, refers to two or more components electrically, or otherwise connected and configured to transmit and receive signals from one another. Signals may include electrical, electromagnetic, visual, audio, radio waves, or another undisclosed signal type alone or in combination. Any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. At least a sensor 104 may include circuitry, computing devices, electronic components or a combination thereof that translates input datum 108 into at least an electronic signal configured to be transmitted to another electronic component. At least a sensor communicatively connected to at least a pilot control may include a sensor disposed on, near, around or within at least pilot control.

Referring still to FIG. 1, at least a sensor 104 may be mechanically and communicatively connected to a foot pedal. Flight control system 104 may incorporate wheeled landing gear steerable by differential braking accessed by floor mounted pedals; in the event of installing such a foot actuated "caveman" infrastructure, yaw control also may be affected through differential foot pressure. A stick may be calibrated at zero input (relaxed state) and at the stops in pitch and roll. The calibration may be done in both directions of roll and both directions of pitch. Any asymmetries may be handled by a bilinear calibration with the breakpoint at the neutral point. Likewise, a yaw zero point may correspond to a relaxed state of an inceptor stick. The full-scale torque in each twist direction may be independently calibrated to the maximum torque seen in the calibration process in that direction. In all phases of flight, the control surface deflections may be linearly mapped to their corresponding maximum stick deflections and neutral position. In the case of roll, where there may be more aileron deflection in the trailing edge up direction, the degrees of deflection per pilot input unit may be different in each direction, such that full surface deflection may be not reached until full stick deflection. When the lift fans are engaged, the pilot's stick inputs may correspond to roll and pitch attitude (+/−30 deg) and yaw rate (+/−60 deg/second) commands, which are also linearly mapped to the full range of stick travel. A breakout force of 2-3 Newtons (0.5 lbf minimums mil spec 1797 min breakout force) measured at center of stick grip position may be applied prior to the linear mapping. Breakout force prevents adverse roll yaw coupling. In order to remove the need for constant control input in steady forward flight, pitch and roll trim may be available. Pitch trim may be limited to +7 deg pitch up trim and −5 deg pitch down trim, which may be sufficient to trim for level flight over the entire center of gravity and cruise airspeed range in non-limiting examples. Roll trim limited to 2 degrees (average between the ailerons) may be also available. The trim may be applied after the breakout force to change the input that center stick corresponds to. This trimmed command applies to both the attitude commands when the lift rotors are powered, and the control surface deflections at all times. In order to ensure the pilot can always access the full capability of the aircraft, the mapping below from pre-trim input to post-trim input may be used when trim is nonzero. Note that with positive trim, the effective sensitivity in the positive direction has decreased while the sensitivity in the negative direction has increased. This is a necessary byproduct of enforcing the constraint that full stick deflection yields full control surface deflection. The lift lever has very low additional breakout torque and requires a constant (but adjustable) torque of 3.1 Nm during movement, which translates to 2 lbf at the intended grip position. Control of the lift motors may be only active when the assisted lift lever may be raised above 3.75 degrees from the full down stop (out of 25 degrees total). This may represent a debounce mechanism that may be determined based on the friction of the assisted lift lever, the mass and the expected cockpit vibration levels. A mechanical detent may be installed on the lift lever at an angle corresponding to 15% average torque in order to provide kinesthetic feedback to the pilot of the minimum lift lever setting which provides adequate control authority via the lift fans.

Still referring to FIG. 1, at least a sensor may include a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. At least a sensor may be configured to detect pilot input from at least pilot control. At least pilot control may include a throttle lever, inceptor stick, collective pitch control, steering wheel, brake pedals, pedal controls, toggles, joystick. One of ordinary skill in the art, upon reading the entirety of this disclosure would appreciate the variety of pilot input controls that may be present in an electric aircraft consistent with the present disclosure. Inceptor stick may be consistent with disclosure of inceptor stick in U.S. patent application Ser. No. 17/001,845 and titled "A HOVER AND THRUST CONTROL ASSEMBLY FOR DUAL-MODE AIRCRAFT", which is incorporated herein by reference in its entirety. Collective pitch control may be consistent with disclosure of collective pitch control in U.S. patent application Ser. No. 16/929,206 and titled "HOVER AND THRUST CONTROL ASSEMBLY FOR DUAL-MODE AIRCRAFT", which is incorporated herein by reference in its entirety.

Further referring to FIG. 1, at least pilot control may be physically located in the cockpit of the aircraft or remotely located outside of the aircraft in another location communicatively connected to at least a portion of the aircraft. "Communicatively connection", for the purposes of this disclosure, is a process whereby one device, component, or circuit is able to receive data from and/or transmit data to another device, component, or circuit; communicative connecting may be performed by wired or wireless electronic communication, either directly or by way of one or more intervening devices or components. In an embodiment, communicative connecting includes electrically coupling an output of one device, component, or circuit to an input of another device, component, or circuit. Communicative connecting may be performed via a bus or other facility for intercommunication between elements of a computing device. Communicative connecting may include indirect connections via "wireless" connection, low power wide area network, radio communication, optical communication, magnetic, capacitive, or optical coupling, or the like. At least pilot control may include buttons, switches, or other binary inputs in addition to, or alternatively than digital controls about which a plurality of inputs may be received. At least pilot control may be configured to receive pilot input. Pilot input may include a physical manipulation of a control like a pilot using a hand and arm to push or pull a lever, or a pilot using a finger to manipulate a switch. Pilot input may include a voice command by a pilot to a microphone and computing system consistent with the entirety of this disclosure. One of ordinary skill in the art, after reviewing the entirety of this disclosure, would appreciate that this is a non-exhaustive list of components and interactions thereof that may include, represent, or constitute, or be connected to at least a sensor 104.

In an embodiment, and still referring to FIG. 1, at least a sensor 104 may be attached to one or more pilot inputs and attached to one or more pilot inputs, one or more portions of an aircraft, and/or one or more structural components, which may include any portion of an aircraft as described in this disclosure. As used herein, a person of ordinary skill in the art would understand "attached" to mean that at least a portion of a device, component, or circuit is connected to at least a portion of the aircraft via a mechanical connection. Said mechanical connection can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling can be used to connect the ends of adjacent parts and/or objects of an electric aircraft. Further, in an embodiment, mechanical coupling can be used to join two pieces of rotating electric aircraft components. Control surfaces may each include any portion of an aircraft that can be moved or adjusted to affect altitude, airspeed velocity, groundspeed velocity or direction during flight. For example, control surfaces may include a component used to affect the aircrafts' roll and pitch which may comprise one or more ailerons, defined herein as hinged surfaces which form part of the trailing edge of each wing in a fixed wing aircraft, and which may be moved via mechanical means such as without limitation servomotors, mechanical linkages, or the like, to name a few. As a further example, control surfaces may include a rudder, which may include, without limitation, a segmented rudder. The rudder may function, without limitation, to control yaw of an aircraft. Also, control surfaces may include other flight control surfaces such as propulsors, rotating flight controls, or any other structural features which can adjust the movement of the aircraft. A "control surface" as described herein, is any form of a mechanical linkage with a surface area that interacts with forces to move an aircraft. A control surface may include, as a non-limiting example, ailerons, flaps, leading edge flaps, rudders, elevators, spoilers, slats, blades, stabilizers, stabilators, airfoils, a combination thereof, or any other mechanical surface are used to control an aircraft in a fluid medium. Persons skilled in the art, upon reviewing the entirety of this disclosure, will be aware of various mechanical linkages that may be used as a control surface, as used and described in this disclosure.

With continued reference to FIG. 1, at least a sensor 104 is configured to capture at least an input datum 108, at least an optimal flight plan datum 112, and at least a performance datum 116. At least a sensor 104 may receive the plurality of datum from a pilot, remote user, or one or more of the previous, alone or in combination. An "input datum," for the purposes of this disclosure, refers to at least an element of data identifying and/or a pilot input or command. At least pilot control may be communicatively connected to any other component presented in system, the communicative connection may include redundant connections configured to safeguard against single-point failure. Pilot input may indicate a pilot's desire to change the heading or trim of an electric aircraft. Pilot input may indicate a pilot's desire to change an aircraft's pitch, roll, yaw, or throttle. Aircraft trajectory is manipulated by one or more control surfaces and propulsors working alone or in tandem consistent with the entirety of this disclosure, hereinbelow. Pitch, roll, and yaw may be used to describe an aircraft's attitude and/or heading, as they correspond to three separate and distinct axes about which the aircraft may rotate with an applied moment, torque, and/or other force applied to at least a portion of an aircraft. "Pitch", for the purposes of this disclosure refers to an aircraft's angle of attack, that is the difference between the aircraft's nose and the horizontal flight trajectory. For example, an aircraft pitches "up" when its nose is angled upward compared to horizontal flight, like in a climb maneuver. In another example, the aircraft pitches "down", when its nose is angled downward compared to horizontal flight, like in a dive maneuver. When angle of attack is not an acceptable input to any system disclosed herein, proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, like in a banking maneuver. "Yaw", for the purposes of this disclosure, refers to an aircraft's turn angle, when an aircraft rotates about an imaginary vertical axis intersecting the center of the earth and the fuselage of the aircraft. "Throttle", for the purposes of this disclosure, refers to an aircraft outputting an amount of thrust from a propulsor. Pilot input, when referring to throttle, may refer to a pilot's desire to increase or decrease thrust produced by at least a propulsor.

With continued reference to FIG. 1, at least an input datum 108 may include an electrical signal. At least an input datum 108 may include mechanical movement of any throttle consistent with the entirety of this disclosure. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. At least a sensor may include circuitry, computing devices, electronic components or a combination thereof that translates pilot input into at least an input datum 108 configured to be transmitted to any other electronic component. Any pilot input as described herein may be consistent with any pilot input as described in U.S. patent application Ser. No. 17/218,387 filed on Mar. 31, 2021, and titled, "METHOD AND SYSTEM FOR FLY-BY-WIRE FLIGHT CONTROL CONFIGURED FOR USE IN ELECTRIC AIRCRAFT," which is incorporated herein in its entirety by reference. Pilot input may include a pilot control which may include a throttle wherein the throttle may be any throttle as described herein, and in non-limiting examples, may include pedals, sticks, levers, buttons, dials, touch screens, one or more computing devices, and the like. Additionally, a right-hand floor-mounted lift lever may be used to control the amount of thrust provided by the lift fans or other propulsors. The rotation of a thumb wheel pusher throttle may be mounted on the end of this lever and may control the amount of torque provided by the pusher motor, or one or more other propulsors, alone or in combination. Any throttle as described herein may be consistent with any throttle described in U.S. patent application Ser. No. 16/929,206 filed on Jul. 15, 2020, and titled, "Hover and Thrust Control Assembly for Dual-Mode Aircraft", which is incorporated herein in its entirety by reference. At least a sensor 104 may be mechanically and communicatively connected to an inceptor stick. The pilot input may include a left-hand strain-gauge style STICK for the control of roll, pitch and yaw in both forward and assisted lift flight. A 4-way hat switch on top of the left-hand stick enables the pilot to set roll and pitch trim. Any inceptor stick described herein may be consistent with any inceptor or directional control as described in U.S. patent application Ser. No. 17/001,845 filed on Aug. 25, 2020, and titled, "A Hover and Thrust Control Assembly for a Dual-Mode Aircraft", which is incorporated herein in its entirety by reference. At least an input datum 108 may include a manipulation of one or more pilot input controls as described above that correspond to a desire to affect an aircraft's trajectory as a function of the movement of one or more flight components and one or more actuators, alone or in combination. "Flight components", for the purposes of this disclosure, includes components related to, and mechanically connected to an aircraft that manipulates a fluid medium in order to propel and maneuver the aircraft through the fluid medium. The operation of the aircraft through the fluid medium will be discussed at greater length hereinbelow.

With continued reference to FIG. 1, at least a sensor 104 is configured to capture at least an optimal flight plan datum 112. An "optimal flight plan datum," for the purposes of this disclosure, is an element or signal of data that represents an electric aircraft route that is safest, most efficient, shortest, or a combination thereof. In a non-limiting embodiment, flight assembly 120 may be configured to generate a flight path towards a closest recharging pad when the controller detects the electric aircraft is low on power. In a non-limiting embodiment, an optimal flight path may include the path to a closest recharging pad. Sensors, as described herein, are any device, module, and/or subsystems, utilizing any hardware, software, and/or any combination thereof to detect events and/or changes in the instant environment and communicate the information to the vehicle controller. at least a sensor 104 may be part of a sensor suite wherein individual sensors may include separate sensors measuring physical or electrical quantities that may be powered by and/or in communication with circuits independently, where each may signal sensor output to a control circuit such as a user graphical interface. As a further example a degree of torque may be sensed, without limitation, using load sensors deployed at and/or around a propulsor and/or by measuring back electromotive force (back EMF) generated by a motor driving the propulsor. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. One of ordinary skill in the art will appreciate, after reviewing the entirety of this disclosure, that motion may include a plurality of types including but not limited to: spinning, rotating, oscillating, gyrating, jumping, sliding, reciprocating, or the like.

With continued reference to FIG. 1, at least a sensor 104 is configured to capture at least a performance datum 116. A "performance datum," for the purposes of this disclosure, is an element or signal of data that represents physical parameters of individual actuators and/or flight components of an electric vehicle. Performance datum 116 may include a measured torque parameter that may include the remaining vehicle torque of a flight component among a plurality of flight components. A "measured torque parameter," for the purposes of this disclosure, refer to a collection of physical values representing a rotational equivalence of linear force. A person of ordinary skill in the art, after viewing the entirety of this disclosure, would appreciate the various physical factors in measuring torque of an object. For instance and without limitation, remaining vehicle torque may be consistent with disclosure of remaining vehicle torque in U.S. patent application Ser. No. 17/197,427 and titled "SYSTEM AND METHOD FOR FLIGHT CONTROL IN ELECTRIC AIRCRAFT", which is incorporated herein by reference in its entirety. Remaining vehicle torque may include torque available at each of a plurality of flight components at any point during an aircraft's entire flight envelope, such as before, during, or after a maneuver. For example, and without limitation, torque output may indicate torque a flight component must output to accomplish a maneuver; remaining vehicle torque may then be calculated based on one or more of flight component limits, vehicle torque limits, environmental limits, or a combination thereof. Vehicle torque limit may include one or more elements of data representing maxima, minima, or other limits on vehicle torques, forces, attitudes, rates of change, or a combination thereof. Vehicle torque limit may include individual limits on one or more flight components, structural stress or strain, energy consumption limits, or a combination thereof. Remaining vehicle torque may be represented, as a non-limiting example, as a total torque available at an aircraft level, such as the remaining torque available in any plane of motion or attitude component such as pitch torque, roll torque, yaw torque, and/or lift torque. The flight assembly 120 may mix, refine, adjust, redirect, combine, separate, or perform other types of signal operations to translate pilot desired trajectory into aircraft maneuvers. In a nonlimiting embodiment a pilot may send a pilot input at a press of a button to capture current states of the outside environment and subsystems of the electric aircraft to be displayed onto an output device in pilot view. The captured current state may further display a new focal point based on that captured current state. Flight control assembly 120 may condition signals such that they can be sent and received by various components throughout the electric vehicle.

With continued reference to FIG. 1, the at least a sensor 104 may include an IMU wherein IMU may be an IMU as described herein to capture the at least a performance datum 116. Capturing the performance datum 116 may include the IMU to detect at least an aircraft angle. Performance datum 116 may include a desired attitude or rate of attitude change. At least an aircraft angle may include any information about the orientation of the aircraft in three-dimensional space such as pitch angle, roll angle, yaw angle, or some combination thereof. In non-limiting examples, at least an aircraft angle may use one or more notations or angular measurement systems like polar coordinates, cartesian coordinates, cylindrical coordinates, spherical coordinates, homogenous coordinates, relativistic coordinates, or a combination thereof, among others. IMU is configured to detect at least an aircraft angle rate. At least an aircraft angle rate may include any information about the rate of change of any angle associated with an electrical aircraft as described herein. Any measurement system may be used in the description of at least an aircraft angle rate 116.

With continued reference to FIG. 1, distributed flight control system 100 includes flight control assembly 120. Flight control assembly 120 may be responsible for mapping the pilot inputs such as at least an input datum 108, at least an optimal flight plan datum 112, and at least a performance datum 116, an attitude such as at least an aircraft angle, and body angular rate measurement such as at least an aircraft angle rate to motor torque levels necessary to meet a pilot input. In a non-limiting exemplary embodiment, flight control assembly 120 may include the nominal attitude command (ACAH) configuration, the flight control assembly 120 may make the vehicle attitude track the pilot attitude while also applying the pilot-commanded amount of assisted lift and pusher torque which may be encapsulated within control allocation command 152. The flight controller is responsible only for mapping the pilot inputs, attitude, and body angular rate measurements to motor torque levels necessary to meet the input datum 108. In the nominal attitude command (ACAH) configuration, flight control assembly 120 makes the vehicle attitude track the pilot attitude while also applying the pilot commanded amount of assisted lift and pusher torque. Flight control assembly 120 may include the calculation and control of avionics display of critical envelope information i.e., stall warning, vortex ring state, pitch limit indicator, angle of attack, transition envelopes, etc. Flight control assembly 120 may calculate, command, and control trim assist, turn coordination, pitch to certain gravitational forces, automation integration: attitude, position hold, LNAV, VNAV etc., minimum hover thrust protection, angle of attack limits, etc., precision Autoland, other aspects of autopilot operations, advanced perception of obstacles for 'see and avoid' missions, and remote operations, among others. Distributed flight control system 100 includes flight control assembly 120, wherein the flight control assembly 120 may further include a processor. The processor may include one or more processors as described herein, in a near limitless arrangement of components.

With continued reference to FIG. 1, distributed flight control system 100 includes may include a higher level flight controller 124. Higher level flight controller may include an outer loop flight controller which is further described later in this disclosure. For instance and without limitation, outer loop flight controller may be consistent with disclosure of outer loop controller in U.S. patent application Ser. No. 17/218,428 and titled, "METHODS AND SYSTEMS FOR FLIGHT CONTROL CONFIGURED FOR USE IN AN ELECTRIC AIRCRAFT," which is incorporated herein by reference in its entirety. Higher level flight controller 124 may include one or more computing devices consistent with this disclosure and/or one or more components and/or modules thereof. Higher level flight controller 124 may also be a lower level flight controller relative to the flight control assembly 120. In a non-limiting embodiment, the flight control assembly 120 may serve as a higher level flight controller and the higher level flight controller 124 of the flight control assembly 120 may be configured to be a lower level flight controller. Higher level flight controller 124 may be implemented using a microcontroller, a hardware circuit such as an FPGA, system on a chip, and/or application specific integrated circuit (ASIC). Higher level flight controller 124 may be implemented using one or more analog elements such as operational amplifier circuits, including operational amplifier integrators and/or differentiators. Higher level flight controller 124 may be implemented using any combination of the herein described elements or any other combination of elements suitable therefor. Higher level flight controller 124 may be configured to input one or more parameters, such as at least an input datum 108, at least an optimal flight plan datum 112, and at least a performance datum 116 and output an attitude control datum 128. Higher level flight controller 124 may periodically detect one or more errors between aircraft angles and commanded angles in any one of pitch, roll, yaw, or a combination thereof. For example, and without limitation, higher level flight controller 124 may detect the error between the commanded and detected aircraft angle and command one or more propulsors and or flight components consistent with the entirety of this disclosure to reduce said error in one or more iterations. Higher level flight controller 124 may be closed by a PI controller with integral anti-windup via back-calculation. Additional logic is present to prevent integral windup while grounded on a not perfectly level surface. Gains may be reduced at large amplitude in order to reduce overshoot on large inputs. This excessive overshoot may be due in part to linear systems having constant percent overshoot, so at larger amplitudes, the absolute value of the overshoot becomes (potentially unacceptably) large. Additionally, on large step inputs, motor saturation (a nonlinear effect) may occur for extended periods of time and causes overshoot to increase. In extreme cases, the occurrence of motor saturation without any gain reduction may lead to unrecoverable tumbles. This gain reduction may be implemented as a (soft) rate command limit. In particular, this reduction may be given by the piecewise combination of a linear function and the square root function. Note that the input/output relationship may be monotonically increasing, so increased angle error or integral action always makes it through to the inner loop, even if the gain reduction may be engaged. For inputs less than the knee, set to 20 deg/s, the input may be not changed. Above the knee, the output may be given by sign(input)*sqrt(abs(input)*knee). The effective gain at any point to the right of the knee may be then given by sqrt(abs(input)*knee)/input. This gain decrease at large amplitudes has been shown in simulation to stabilize the vehicle when subject to inputs that would otherwise destabilize the vehicle into an unrecoverable tumble. For the vast majority of maneuvers, this soft rate limit may be set high enough to not be noticeable.

With continued reference to FIG. 1, higher level flight controller 124 is configured to receive at least an input datum 108, at least an optimal flight plan datum 112, and at least a performance datum 116 from at least a sensor 104. Input datum 108 represents the pilot's desire to change an electric aircraft's heading or power output. Input datum 108 may be transmitted to one or more components from the pilot control to which it may be connected. Higher level flight controller 124 may include circuitry, components, processors, transceivers, or a combination thereof configured to receive and/or send electrical signals. Input datum 108 and other inputs to this system may include pilot manipulations of physical control interfaces, remote signals generated from electronic devices, voice commands, physiological readings like eye movements, pedal manipulation, or a combination thereof, to name a few. Higher level flight controller 124 may include a proportional-integral-derivative (PID) controller. PID controllers may automatically apply accurate and responsive correction to a control function in a loop, such that over time the correction remains responsive to the previous output and actively controls an output. Flight controller 104 may include damping, including critical damping to attain the desired setpoint, which may be an output to a propulsor in a timely and accurate way.

With continued reference to FIG. 1, higher level flight controller 124 is configured to generate attitude control datum 128 as a function of at least an input datum 108, at least an optimal flight datum 112, and at least a performance datum 116. An "attitude control datum," for the purposes of this disclosure, is an element or signal of data representing physical or electronic values for controlling the orientation of an electric vehicle. The flight controller uses an outer angle loop driving an inner rate loop to provide closed loop control with setpoints of desired pitch attitude, roll attitude, and yaw rate provided directly by the pilot. The outer loop provides a rate setpoint. The attitude control datum may include a rate setpoint which may include the desired rate of change of one or more angles describing the aircraft's orientation, heading, and propulsion, or a combination thereof. Rate setpoint may include the pilot's desired rate of change of aircraft pitch angle, consistent with pitch angles, and largely at least an aircraft angle 116 in the entirety of this disclosure. Rate setpoint may include a measurement in a plurality of measurement systems including quaternions or any other measurement system as described herein. Higher level flight controller 124 may reduce complex instructions into a set of simple commands that are then provided to lower level flight controllers such as one or more modular flight controllers 132. The higher level flight controller may control the position and velocity of the electric vehicle while one or more modular flight controllers may control the attitude of the aircraft. At least an actuator may receive instruction from one or more modular flight controllers 132.

With continued reference to FIG. 1, flight control assembly 120 may include an embodiment of a plurality of modular flight controllers 132. The plurality of modular flight controllers 132 may include a suite of modular flight controllers wherein each modular flight controller 132 may be communicatively connected to an individual actuator 148 or a set of actuators 148. In a non-limiting embodiment, the plurality of modular flight controllers may be configured in a pyramid structure wherein each modular flight controller communicates to and/or with a higher level modular flight controller unless it is the highest level modular flight controller within the pyramid comprising of multiple modular flight controllers, wherein a higher level modular flight controller, may provide an actuator instruction datum 136 to its corresponding lower level modular flight controllers. In a non-limiting embodiment, the structure of the plurality of modular flight controllers 132 may include any top-down approach. A "top-down approach," for the purposes of this disclosure, refer to a structure of control where a highest level modular flight controller may control the dynamics of the ecosystem of the plurality of modular flight controllers. A person of ordinary skill in the art, after reviewing the entirety of this disclosure, would appreciate the hierarchical control structure of modular flight controllers. For instance, a higher level modular flight controllers may produce an actuator instruction datum 136 which may include a set of instructions to be transmitted to a plurality of lower level modular flight controllers which may be connected to a plurality of individual actuators 148 wherein each lower level modular flight controller has the same set of instructions with the other lower level modular flight controller connected to the same higher level modular flight controller so each actuator may perform the same set of instructions. For instance, a set of actuators which includes a set of four propulsors may be connected to an individual lower level modular flight controller wherein each lower level modular flight controller may transmit the same set of instructions to each propulsor such as an angle rate or torque output to follow. In a non-limiting embodiment, a higher level modular flight controller may include an outer loop flight controller that may control a position of an actuator of an electric aircraft. In a non-limiting embodiment, a lower level modular flight controller may include an inner loop controller that may stabilize an electric aircraft by controlling actuators that affect angular velocities. In a non-limiting embodiment, the plurality of modular flight controllers may determine a speed for a rotor, a tilt angle of a flap, an amount of thrust used, or any other appropriate factor. the plurality of modular flight controllers may perform full feedback control. For instance, a lower level flight controller may determine an actual attitude or attitude rate of an electric aircraft and compare to a desired attitude or attitude rate of the aircraft. The modular flight controller may then determine instructions to lower the difference between the two values. The aircraft may comprise an equal number of lower level flight computers. An exemplary embodiment of lower level flight controllers and/or plurality of modular flight controllers is further described in FIG. 4.

With continued reference to FIG. 1, higher level flight controller 124 may include a mode-switch mechanism of a distributed flight control system 100. In a non-limiting embodiment, a plurality of modular flight controllers 132 may have an option to be controlled by a higher level flight controller 124 or to be controlled manually by at least a pilot input and/or pilot. The plurality of modular flight controllers 132 may constantly calculate actuator 148 actions in order to maintain a base level of flight of an electric aircraft. They may further factor in instructions given by a higher level flight controller 124 or a flight control assembly 120 or by a pilot directing the aircraft's flight trajectory. The flight control assembly 120 and its plurality of flight controllers may each comprise independent code or hardware to determine when to switch from listening to a higher level flight controller 124 to listening to manual control. Control may be desired to switch over to a manual mode in the event a malfunction is detected in the higher level flight controller 124 or an irregularity is detected. In a non-limiting embodiment, the aircraft's actual state is tracked and compared to an aircraft's desired state which may include a specific configuration of a plurality of actuators 148 a pilot and/or flight control assembly 120 and at least a modular flight controller 132 have decided. In the event the actual state does not track the desired state appropriately, the flight control assembly 120 may signal that a malfunction is detected. A pilot's controls may comprise a switch, button, application, or other mechanism to select a mode.

With continued reference to FIG. 1, flight control assembly 120 includes a plurality of modular flight controllers. Each modular flight controller 132 of a plurality of modular flight controllers may be a lower level flight controller which may further include an inner loop flight controller. For instance and without limitation, inner loop flight controller may be consistent with disclosure of inner loop controller in U.S. patent application Ser. No. 17/218,428 and titled, "METHODS AND SYSTEMS FOR FLIGHT CONTROL CONFIGURED FOR USE IN AN ELECTRIC AIRCRAFT," which is incorporated herein by reference in its entirety. Inner loop flight controller may be implemented in any manner suitable for implementation of outer loop controller. The inner loop of the flight controller may be composed of a lead-lag filter for roll rate, pitch rate, and yaw rate, and an integrator that acts only on yaw rate. Integrators may be avoided on the roll and pitch rate because they introduce additional phase lag that, coupled with the phase lag inherent to slow lift fans or another type of one or more propulsors, limits performance. Furthermore, it may not be necessary to have good steady state error in roll and pitch rate, which an integrator helps achieve in yaw rate. A final component of the inner loop may include gain scheduling on lift lever input. As previously discussed, the only controller change between low speed flight and fully wing-borne flight may be this gain scheduling. The plot below shows the input to output gain of this function for varying lift lever inputs. At anything above the assisted lift input corresponding to zero airspeed flight, the full requested moment from the inner loop may be sent to the central flight controller 140. At assisted lift levels lower than this, the requested moment from the inner loop may be multiplied by a gain that linearly decays to zero as shown in the plot below. The exact shape of this gain reduction may be opened to change slightly. Experimentation in simulation has shown that anything between a square root function up to the IGE average torque setting and the linear map shown above works acceptably. Because the moment that can be generated by the control surfaces in pitch may be such a strong function of angle of attack, the relatively small difference in hover moment achieved between the linear and square root maps may be washed out by the angle of attack variation in a transition. At low lift lever input, the plane would have to have significant unpowered lift (and therefore airspeed) to not lose altitude. In this case, the control surface effectivity will be significant, and full moment production from the lift motors will not be necessary. When the lift lever may be all the way down, the lift motors may stop rotation and stow into a low drag orientation. Then, the only control authority comes from the aerodynamic control surfaces, and the plane controlled exclusively via manual pilot inputs. On transition out from vertical to cruise flight, the coordination and scheduling of control may be intuitive and straightforward. In a non-limiting example, during the transition in, or decelerating from an aborted takeoff, it may be important that the pilot not decrease assisted lift below a 15% average torque threshold in order to maintain aircraft control and not develop an unrecoverable sink rate when operating in certain airspeed regimes such as the transition regime. A mechanical detent may be installed in the lift lever, throttle, or any control input, to provide proprioceptive feedback when crossing this threshold which should occur operationally only during the terminal phases of a vertical landing.

With continued reference to FIG. 1, modular flight controller 132 is configured to receive at least an input datum 108, at least an optimal flight plan datum 112, and at least a performance datum 116 as a function of at least a sensor 104. Modular flight controller 132 is configured to receive the attitude control datum 128 from the higher level flight controller 124. Modular flight controller 132 is configured to generate an actuator instruction datum 136 as a function of the attitude control datum 128. An "actuator instruction datum," for the purposes of this disclosure, refer to an element or signal of data representing a program for electronic components to follow. Actuator instruction datum 136 may include any information describing the moment of an aircraft. Actuator instruction datum 136 includes information regarding pilot's desire to apply a certain moment or collection of moments on one or more portions of an electric aircraft, including the entirety of the aircraft.

With continued reference to FIG. 1, modular flight controller 132 may include a lead-lag-filter. Modular flight controller 132 may include an integrator. The attitude controller gains are scheduled such that full gain authority may be only achieved when the assisted lift lever may be greater than 50% torque, which corresponds to a nominal torque required to support the aircraft without fully developed lift from the wing. At average torque levels lower than said nominal levitation torque, the output of the inner loop (desired moment vector to apply to the vehicle) may be directly scaled down. This decrease in moment generated at the lift rotors may be designed to be directly complementary to the increase in aerodynamic control surface effectivity as the dynamic pressure builds on the flying wing and the flying surfaces. As a result, the total moment applied to the vehicle for a given pilot input may be kept near constant.

With continued reference to FIG. 1, distributed flight control system 100 may include a central flight controller 140. Central flight controller 140 may identify how much moment was generated by aerodynamic forces acting on one or more flight components and propulsors and may feed this back to modular flight controller 132 and higher level flight controller 124 to prevent integral windup. A dynamic inverse of the lift rotor system may be applied to the control allocation command 152 to compensate for the rotor inertia, which will be discussed at greater length hereinbelow. The input datum 108, which represents one or more desires of a pilot or user that may include pusher torques, may be directly passed through the controller; full rotation of the pusher throttle yields full torque at the pusher. As discussed previously, the control surface deflections are driven directly from the pilot roll, pitch, and yaw inputs, which may also be included in input datum 108. Central flight controller 140 may map desired vehicle level control torques (as produced by the modular flight controller 132) to appropriate actuator outputs via knowledge of the vehicle layout and properties. In the case that motor saturation prevents the achievement of the desired vehicle level control torques, the central flight controller 140 will deprioritize the yaw moment, then assisted lift, then roll moment, and finally pitch moment.

With continued reference to FIG. 1, central flight controller 140 may include a logic circuit. Central flight controller 140 may be implemented using an electrical logic circuit. A "logic circuits", for the purposes of this disclosure, is an arrangement of electronic components such as diodes or transistors acting as electronic switches configured to act on one or more binary inputs that produce a single binary output. Logic circuits may include devices such as multiplexers, registers, arithmetic logic units (ALUs), computer memory, and microprocessors, among others. In modern practice, metal-oxide-semiconductor field-effect transistors (MOSFETs) may be implemented as logic circuit components. Central flight controller 140 may be implemented using a processor which may include any computing device or processor described in the entirety of this disclosure. Central flight controller 140 is configured to receive the actuator instruction datum 136 for at least a propulsor from modular flight controller 132. Central flight controller 140 solves at least an optimization problem. At least an optimization problem may include solving the pitch moment function that may be a nonlinear program.

With continued reference to FIG. 1, a "central flight controller", for the purposes of this disclosure, may be a component that takes in at least an incoming signal, such as actuator instruction datum 136 including plurality of attitude commands and allocates one or more outgoing signals, such as modified attitude commands and output torque command, or the like, to at least a propulsor, flight component, or one or more computing devices connected thereto. One of ordinary skill in the art, after reading the entirety of this disclosure, would be aware that a central flight controller 140, as used herein, may additionally or alternatively be described as performing "control allocation" or "torque allocation". For example, central flight controller 140 may take in commands to alter aircraft trajectory that requires a change in pitch and yaw. Central flight controller 140 may allocate torque to at least one propulsor (or more) that do not independently alter pitch and yaw in combination to accomplish the command to change pitch and yaw. More than one propulsor may be required to adjust torques to accomplish the command to change pitch and yaw, central flight controller 140 would take in the command and allocate those torques to the appropriate propulsors consistent with the entirety of this disclosure. One of ordinary skill in the art, after reading the entirety of this disclosure, will appreciate the limitless combination of propulsors, flight components, control surfaces, or combinations thereof that could be used in tandem to generate some amount of authority in pitch, roll, yaw, and lift of an electric aircraft consistent with this disclosure. Central flight controller 140 may be a nonlinear program-based central flight controller 140 that create new frequencies from two signals applied to it. In most applications, two signals are applied to central flight controller 140, and it produces new signals at the sum and difference of the original frequencies. Other frequency component may also be produced in a practical frequency central flight controller 140. One of ordinary skill in the art would understand that, in general, central flight controller 140s are widely used to shift signals from one frequency range to another, a process known as heterodyning. Another form of central flight controller 140 operates by switching, with the smaller input signal being passed inverted or noninverted according to the phase of the local oscillator (LO). This would be typical of the normal operating mode of a packaged double balanced central flight controller 140, with the local oscillator drive considerably higher than the signal amplitude. Central flight controller 140 may be consistent with any central flight controller 140 described herein. Central flight controller 140 may be implemented using an electrical logic circuit. "Logic circuits", for the purposes of this disclosure, refer to an arrangement of electronic components such as diodes or transistors acting as electronic switches configured to act on one or more binary inputs that produce a single binary output. Logic circuits may include devices such as multiplexers, registers, arithmetic logic units (ALUs), computer memory, and microprocessors, among others. In modern practice, metal-oxide-semiconductor field-effect transistors (MOSFETs) may be implemented as logic circuit components. Central flight controller 140 may be implemented using a processor. Central flight controller 140 is configured to receive the initial vehicle torque signal for at least a propulsor from flight controller. Central flight controller 140 solves at least an optimization problem. At least an optimization problem may include solving the pitch moment function that may be a nonlinear program. Torque allocation performed by central flight controller 140 may be consistent with the description of torque allocation in U.S. patent application Ser. No. 17/197,427 filed on Mar. 10, 2021 and titled, "SYSTEM AND METHOD FOR FLIGHT CONTROL IN ELECTRIC AIRCRAFT", which is incorporated herein in its entirety by reference.

With continued reference to FIG. 1, central flight controller 140 may be configured to solve at least an optimization problem, which may be a priority command datum 144. A "priority command datum," as used in this disclosure, refer to a set or elements of data representing a plurality of actuator instruction datum 136 that may be used to generate a final actuator instruction datum that prioritizes a pilot preference. Pilot command datum may also refer to a mathematical function with a solution set including a plurality of data elements to be compared. Pilot preference may include an electric vehicle's flight that may be the most efficient, shortest, safest, or combination thereof. In a non-limiting embodiment, an electric aircraft may configure its actuators to perform a flight that prioritizes the most efficient use of energy or power, perform a flight that is the fastest and/or shortest distance, perform a flight that is the safest, and the like. A person of ordinary skill in the art, after viewing the entirety of this disclosure, would appreciate the various flight paths or options that a pilot may want to prioritize. Central flight controller 140 may generate the priority command datum 144 as a function of a machine-learning model. The machine-learning model may use a training data including priority levels for a plurality of actuator configurations. Central flight controller 140 may receive the at least a actuation instruction datum 136, the at least an input datum 108, the at least an optimal flight plan datum 112, and the at least a performance datum 116 as inputs to be trained by the training data. Central flight controller 140 may be configured to receive at least an actuator instruction datum 136 and generate the priority command datum 144. Central flight controller 140 may be a lower level flight controller. Central flight controller 140 may compute a score, metric, ranking, or the like, associated with each performance prognoses and candidate transfer apparatus and select objectives to minimize and/or maximize the score/rank, depending on whether an optimal result may be represented, respectively, by a minimal and/or maximal score; a priority command datum 144 may be used by central flight controller 140 to score each possible pairing. At least an optimization problem may be based on one or more objectives, as described below. Central flight controller 140 may pair a candidate transfer apparatus, with a given combination of performance prognoses, that optimizes the priority command datum 144. In various embodiments solving at least an optimization problem may be based on a combination of one or more factors. Each factor may be assigned a score based on predetermined variables. In some embodiments, the assigned scores may be weighted or unweighted. Solving at least an optimization problem may include performing a greedy algorithm process, where optimization may be performed by minimizing and/or maximizing an output of priority command datum 144. A "greedy algorithm" is defined as an algorithm that selects locally optimal choices, which may or may not generate a globally optimal solution. For instance, central flight controller 140 may select objectives so that scores associated therewith are the best score for each goal. For instance, in non-limiting illustrative example, optimization may determine the pitch moment associated with an output of at least a propulsor based on an input.

Still referring to FIG. 1, at least an optimization problem may be formulated as a linear priority command datum 144, which central flight controller 140 may optimize using a linear program such as without limitation a mixed-integer program. A "linear program," as used in this disclosure, is a program that optimizes a linear priority command datum 144, given at least a constraint; a linear program maybe referred to without limitation as a "linear optimization" process and/or algorithm. For instance, in non-limiting illustrative examples, a given constraint might be torque limit, and a linear program may use a linear priority command datum 144 to calculate maximum output based on the limit. In various embodiments, central flight controller 140 may determine a set of instructions towards achieving a user's goal that maximizes a total score subject to a constraint that there are other competing objectives. A mathematical solver may be implemented to solve for the set of instructions that maximizes scores; mathematical solver may be implemented on central flight controller 140 and/or another device in distributed flight control system 100, and/or may be implemented on third-party solver. At least an optimization problem may be formulated as nonlinear least squares optimization process. A "nonlinear least squares optimization process," for the purposes of this disclosure, is a form of least squares analysis used to fit a set of m observations with a model that is non-linear in an unknown parameters, where m is greater than or equal to n. The basis of the method is to approximate the model by a linear one and to refine the parameters by successive iterations. A nonlinear least squares optimization process may output a fit of signals to at least a propulsor. Solving at least an optimization problem may include minimizing a loss function, where a "loss function" is an expression an output of which a ranking process minimizes to generate an optimal result. As a non-limiting example, central flight controller 140 may assign variables relating to a set of parameters, which may correspond to score components as described above, calculate an output of mathematical expression using the variables, and select an objective that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs.

With continued reference to FIG. 1, central flight controller 140 may include an inertia compensator. An inertia compensator as described herein may be implemented in any one or more separate subsystems separate from any central flight controller 140 as described herein and operate similarly to any inertia compensator implemented in a central flight controller 140. An inertia compensator may include one or more computing devices, an electrical component, circuitry, one or more logic circuits or processors, or the like, which may be configured to compensate for inertia in one or more propulsors present in system. Central flight controller 140 may be configured, in general, to output signals and command propulsors to produce a certain amount of torque; however, real-world propulsors contain mass, and therefore have inertia. "Inertia", for the purposes of this disclosure, is a property of matter by which it continues in its existing state of rest or uniform motion in a straight line, unless that state may be changed by an external force. Specifically, in this case, a massive object requires more force or torque to start motion than may be required to continue producing torque. In a control system, central flight controller 140 must therefore modulate the would-be signal to account for inertia of the physical system being commanded. The inertia compensator may make appropriate calculations based on modified attitude command, output torque command, and other considerations like environmental conditions, available power, vehicle torque limits, among others. Inertia compensator may adjust vehicle torque limits for certain periods of time wherein, for example, output torque command may be allowed to overspeed a propulsor to start the propulsor's rotating physical components and then quickly step down the torque as required to maintain the commanded torque. The inertia compensator which may include a lead filter.

With continued reference to FIG. 1, the central flight controller 140 is configured to generate control allocation command 152 as a function of at least a priority command datum 144 and at least an actuator instruction datum 136. "Control allocation command," for the purposes of this disclosure, refer to a set of instructions, software program, or electronic signals that at least a central flight controller 140 or at least a modular flight controller 132 as a function of at least a flight control assembly 120 may automatically run and/or perform. The performance of the control allocation command 152 is done by at least an actuator 148. The control allocation command 152 may include a set of individual control allocation commands that may correspond to individual actuators 148 or to a set of actuators. Control allocation command 152 may include at least a torque vector. Control allocation command 152 may be represented in any suitable form, which may include, without limitation, vectors, matrices, coefficients, scores, ranks, or other numerical comparators, and the like. A "vector" as defined in this disclosure is a data structure that represents one or more quantitative values and/or measures of forces, torques, signals, commands, or any other data structure as described in the entirety of this disclosure. A vector may be represented as an n-tuple of values, where n is at least two values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and may be distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes. One of ordinary skill in the art would appreciate a vector to be a mathematical value consisting of a direction and magnitude.

With continued reference to FIG. 1, "torque", for the purposes of this disclosure, refers to a twisting force that tends to cause rotation. Torque is the rotational equivalent of linear force. In three dimensions, the torque may be a pseudovector; for point particles, it may be given by the cross product of the position vector (distance vector) and the force vector. The magnitude of torque of a rigid body depends on three quantities: the force applied, the lever arm vector connecting the point about which the torque may be being measured to the point of force application, and the angle between the force and lever arm vectors. A force applied perpendicularly to a lever multiplied by its distance from the lever's fulcrum (the length of the lever arm) may be its torque. A force of three newtons applied two meters from the fulcrum, for example, exerts the same torque as a force of one newton applied six meters from the fulcrum. The direction of the torque can be determined by using the right-hand grip rule: if the fingers of the right hand are curled from the direction of the lever arm to the direction of the force, then the thumb points in the direction of the torque. One of ordinary skill in the art would appreciate that torque may be represented as a vector, consistent with this disclosure, and therefore includes a magnitude of force and a direction. "Torque" and "moment" are equivalents for the purposes of this disclosure. Any torque command or signal herein may include the at least a steady state torque to achieve the initial vehicle torque signal 108 output to at least a propulsor.

With continued reference to FIG. 1, as previously disclosed, solving at least an optimization problem may include solving sequential problems relating to vehicle-level inputs to at least a propulsor, namely pitch, roll, yaw, and collective force. Central flight controller 140 may solve at least an optimization problem in a specific order. In a non-limiting embodiment, the central flight controller 140 may solve at least an optimization problem wherein at least an optimization problem includes a pitch moment function. Solving may be performed using a nonlinear program and/or a linear program. Central flight controller 140 may solve at least an optimization problem wherein solving at least an optimization program may include solving a roll moment function utilizing a nonlinear program to yield the desired amount of roll moment as a function of the desired amount of pitch moment. Central flight controller 140 may solve at least an optimization problem wherein solving at least an optimization program may include solving a collective force function utilizing a nonlinear program to yield the desired amount of collective force as a function of the desired amount of pitch moment and the desired amount of roll moment. Central flight controller 140 may solve at least an optimization problem wherein solving at least an optimization program may include solving a yaw moment function utilizing a nonlinear program to yield the desired amount of yaw moment, as a function of the desired amount of pitch moment, the desired amount of roll moment, and the desired amount of collective force. One of ordinary skill in the art, after reading the entirety of this disclosure, will appreciate that any force program may be implemented as a linear or non-linear program, as any linear program may be expressed as a nonlinear program.

With continued reference to FIG. 1, central flight controller 140 may include one or more computing devices as described herein. Central flight controller 140 may be configured to allocate a portion of total possible torque amongst one or more propulsors based on relative priority of a plurality attitude control commands and desired aircraft maneuver. In a non-limiting illustrative example, torque allocation between two attitude control components (e.g., pitch and roll or roll and yaw) may be based on the relative priorities of those two attitude control components. Priority refers to how important to the safety of the aircraft and any users while performing the attitude control component may be relative to the other attitude control commands. Priority may also refer to the relative importance of each attitude control component to accomplish one or more desired aircraft maneuvers. For example, pitch attitude control component may be the highest priority, followed by roll, lift, and yaw attitude control components. In another example, the relative priority of the attitude components may be specific to an environment, aircraft maneuver, mission type, aircraft configuration, or other factors, to name a few. Torque allocator may set the highest priority attitude control component torque allocation as close as possible given the torque limits as described in this disclosure to the original command for the higher-priority attitude control component, in the illustrative example, pitch, then project to the value possible for the lower priority attitude control component, in this case, lift. The higher priority attitude control component in the first torque allocation may be the attitude control component with the highest overall priority. This process may be then repeated with lower priority attitude control component from the above comparison and the next highest down the priority list. In a non-limiting illustrative example, the next two-dimensional torque allocation problem solved would include lift and roll attitude control commands. In embodiments, the lower priority attitude command component has already been set form the previous two-dimensional torque allocation, so this may be projecting the closest possible value for the third-level attitude command (roll in this example). This process would repeat again for the third and fourth attitude components, in this non-limiting example, roll and yaw attitude control components. Since roll may be prioritized over yaw, the roll attitude control command would be preserved, and yaw would be sacrificed as a function of the vehicle torque limits as described herein. After the sequence of two-dimensional attitude control component torque allocation are completed and four prioritized attitude component commands are set, one or more components may send out commands to flight control surfaces/propulsors to generate the set torque values allocated in the foregoing process. As a non-limiting example of one step in the torque allocation process, pitch axis may represent the command or plurality of attitude commands inputted to central flight controller 140 as described herein, such as actuator instruction datum 136. Pitch axis may be conditioned or altered to be inputted to central flight controller 140. For example, and without limitation, initial vehicle torque signal may include pitch and lift commands within plurality of attitude commands. Central flight controller 140 may also receive at least an actuator instruction datum 136, which may be represented without limitation by a box plotted within the pitch and lift axes. A point where pitch command and lift command intersect may represent initial vehicle torque signal as projected onto exemplary graph of pitch and lift axes, which may be the same or similar to initial vehicle torque signal as disclosed in the entirety of this disclosure. Central flight controller 140 utilizes prioritization data as described in the entirety of this disclosure to solve this two-dimensional problem by preserving the higher priority command and sacrificing the lower priority command. This prioritization preservation process may be illustrated, as a non-limiting example by placement of a modified attitude command, wherein the pitch command was preserved (horizontally translated and therefore unchanged from the initial command), while the lift command was lessened to bring the modified attitude command within vehicle torque limits (the box). The modified attitude command, as discussed in the entirety of this disclosure, may be further combined, modified, conditioned, or otherwise adjusted to produce output torque command to the plurality of propulsors. The remaining vehicle torque represents the remaining torque capability in one or more propulsors before, during, and after an aircraft maneuver. The remaining vehicle torque may include an individual propulsor's remaining torque capability, one or more of pitch, roll, yaw, and lift, capabilities of one or more propulsors, the remaining vehicle-level torque or power for subsequent maneuvers. The remaining vehicle torque may be displayed to a pilot or user. The above-described may be a non-limiting example of one step in the torque allocation process. Torque allocation process may be similar or the same process as described above with the torque limits adjusted for inertia compensation. Central flight controller 140 may be disposed fully or partially within central flight controller 140 any central flight controller 140 as disclosed herein. Central flight controller 140 may include one or more computing devices as described herein. Central flight controller 140 also receives at least a vehicle torque limit represented by an imaginary box plotted within the pitch and lift axes, which may be the same as, or similar to at least a vehicle torque limit. Here instead of the box being made of straight linear sides, the inertia compensation as previously discussed creates curved limits, wherein certain plurality of attitude commands may be allowed whereas without inertia compensation they would be outside of the limits. Where the pitch command and lift command intersect may be the initial vehicle torque signal, which may be the same or similar to initial vehicle torque signal as disclosed in the entirety of this disclosure. Central flight controller 140 utilizes prioritization data as described in the entirety of this disclosure to solve this two-dimensional problem by preserving the higher priority command and sacrificing the lower priority command. This prioritization preservation process may be shown by the placement of modified attitude command, wherein the pitch command was preserved (horizontally translated and therefore unchanged from the initial command), while the lift command was lessened to bring the modified attitude command within vehicle torque limits (the box). Control allocation command 152 effectively commands the amount of torque to one or more propulsors to accomplish the closest vehicle level torque to initial vehicle torque signal as possible given certain limits, maneuvers, and aircraft conditions. Modified attitude command, as discussed in the entirety of this disclosure, may be further combined, modified, conditioned, or otherwise adjusted to produce output torque command to the plurality of propulsors. The remaining vehicle torque represents the remaining torque capability in one or more propulsors before, during, and after an aircraft maneuver. The remaining vehicle torque may include an individual propulsor's remaining torque capability, one or more of pitch, roll, yaw, and lift, capabilities of one or more propulsors, the remaining vehicle-level torque or power for subsequent maneuvers. Remaining vehicle torque may be displayed to a pilot or user.

With continued reference to FIG. 1, control allocation command 152 is configured to be transmitted to at least an actuator 148 as a control command. Actuators 148 and control surfaces may be commanded exclusively by the pilot or by one or more users, or one or more computing devices. At least an actuator 148 may include at least a flight component which may be consistent with any of the flight components and/or control surfaces as described herein. "Actuator," for the purposes of this disclosure, refers to a component of a machine that is responsible for moving and controlling a mechanism or system of an electric vehicle. At least an actuator 148 may include at least one of a motor, a flap, a pushrod, a control surface, a mechanism, or a component that interacts with the physical world. "Flight components", for the purposes of this disclosure, includes components related to, and mechanically connected to an aircraft that manipulates a fluid medium in order to propel and maneuver the aircraft through the fluid medium. The operation of the aircraft through the fluid medium will be discussed at greater length hereinbelow. At least an input datum 108 may include information gathered by one or more sensors. In non-limiting embodiments, flight components may include propulsors, wings, rotors, propellers, pusher propellers, ailerons, elevators, stabilizers, stabilators, and the like, among others.

With continued reference to FIG. 1, the control allocation command 152 may be transmitted to a display 156. Display 156 may include an output device. "Output device", for the purposes of this disclosure, refers to a visual apparatus that is comprised of compact flat panel designs, liquid crystal display, organic light-emitting diode, or combination thereof to present visual information superimposed on spaces. Display 156 may include a graphical user interface (GUI), multi-functional display (MFD), primary flight display (PFD), gages, dials, screens, touch screens, speakers, haptic feedback device, live feed, window, combination thereof, or another display type not listed here. In a nonlimiting embodiment, display 156 may include a mobile computing device like a smartphone, tablet, computer, laptop, client device, server, a combination thereof, or another undisclosed display alone or in combination. Display 236 may be disposed in at least a portion of a cockpit of an electric aircraft. Display 156 may be a heads-up display (HUD) disposed in goggles, glasses, eye screen, or other headwear a pilot or user may be wearing. Display 156 may include augmented reality, virtual reality, or combination thereof.

Still referring to FIG. 1, display 156 may include monitor display that may display information in pictorial form. Monitor display may include visual display, computer, and the like. For example, monitors display may be built using liquid crystal display technology that displays to the pilot information from a computer's user interface. Output device may include any processor and/or computing device containing any processor suitable for use in and/or with an augmented reality device. Display 156 may include any component and/or element suitable for use with augmented reality over-head display. The display 156 may further include at least a peripheral display. The peripheral display may further be mounted to a pilot's head that is in the peripheral of the user's field of view. In a non-limiting embodiment, the pilot interface may view the outside environment as a function of the sensors and flight controller and generate a focal point as a dot on the at least peripheral display. Display 156 may be designed and/or configured to perform any method, method step, or sequence of method steps in any embodiment described in this disclosure, in any order and with any degree of repetition. For instance, display 156 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Display 156 may perform any step or sequence of steps as described in this disclosure in parallel, such as simultaneously and/or substantially simultaneously performing a step two or more times using two or more parallel threads, display 156 cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, the display 156 may display the control allocation command 152 wherein the control allocation command 152 may include any control allocation command as described herein. In a non-limiting embodiment, the control allocation command 152 may be displayed in a gauge format, graph format, and the like. Display may further include a number representing the velocity of the electric aircraft in flight that may be displayed onto the output device. In a non-limiting embodiment, the control allocation command 152 may be displayed in a noticeable but non-distracting position on the display 156 and highlight the control allocation command 152 and at least a set of instructions that may include a plurality of actuator instruction datum 136 that a pilot may command to achieve optimal flight. Display 156 may display a plurality of health statuses of a plurality of actuators 148.

With continued reference to FIG. 1, the display 156 may include a non-limiting embodiment that includes a focal point that indicates the desired landing location for the VTOL aircraft. "Focal point", for the purposes of this disclosure, refers to a piece of data that represents an electronic symbol that is trailed by a guidance symbol representing an optimal flight path. The focal point may be determined by at least a predetermined flight plan. "Guidance symbol", for the purposes of this disclosure, refers to a pattern, indicium, or array of symbols indicating a direction or position to be traversed by a vehicle on the way to the desired location indicated by the focal point. For example, the pilot may follow the flight path the guidance symbol is protruding to the desired location indicated by the focal point.

With continued reference to FIG. 1, display 156 may include a graphical user interface (GUI). In a non-limiting embodiment, the GUI may display the current flight plan and/or optimal flight path in graphical form. Graphical form may include a two-dimensional plot of two variables that represent data received by the controller, such as past maneuvers and predicted future maneuvers. In one embodiment, GUI may also display the user's input in real-time. The GUI may further include to display the velocity and position of the electric aircraft based on provided future inputs. In another embodiment, GUI may display the maneuver that was just performed by the user, the suggested maneuver to be performed and the maneuver being currently performed by the user. In one embodiment, GUI will display a different suggested maneuver upon deviation by the user from flight plan. In a non-limiting example, GUI may display different color schemes for immediate past maneuver, suggested immediate future maneuver, and the like. In a non-limiting embodiment, GUI may display objective and a directional line once objective is nearby. In one embodiment, GUI may display a directional path to the objective when flight plan is set for an intermediate objective. In a nonlimiting example, GUI may display a dotted path additionally to the suggested maneuvers and a graphical representation of the objective one user gets near the objective as to assist user when landing or reaching objective. In another nonlimiting example, GUI may display a dotted line connected to the final objective as to keep user informed of direction of final objective when flight plan is set for an intermediate objective. A person of ordinary skill in the art, after viewing the entirety of this disclosure, would appreciate the incorporation of a display and/or GUI in informing a pilot of the commands and controls of the electric aircraft.

With continued reference to FIG. 1, the display 156y may provide flight information to a pilot of the aircraft. The display may enable the pilot to control the aircraft, for example via a touch screen. In a non-limiting embodiment, a mode switch, pilot controls, and kill switch may also be associated with a pilot input. Mode switch may comprise a button, switch, or other control that enables a pilot to switch between manual mode and higher level flight computer automatic mode. Kill switch may allow the pilot to disable power to all actuators of the aircraft, such as all the rotors. In a non-limiting embodiment, pilot controls may comprise one or more physical objects the pilot manipulates to adjust the aircraft's position. For example, a joystick, steering wheel, pedal, lever, or any other appropriate control may be used. In some embodiments, a boot button may exist. The boot button may be used to power on the system. The power up and power down mechanisms may be physically separate in order to decrease chances of triggering an incorrect action.

Figure 2:
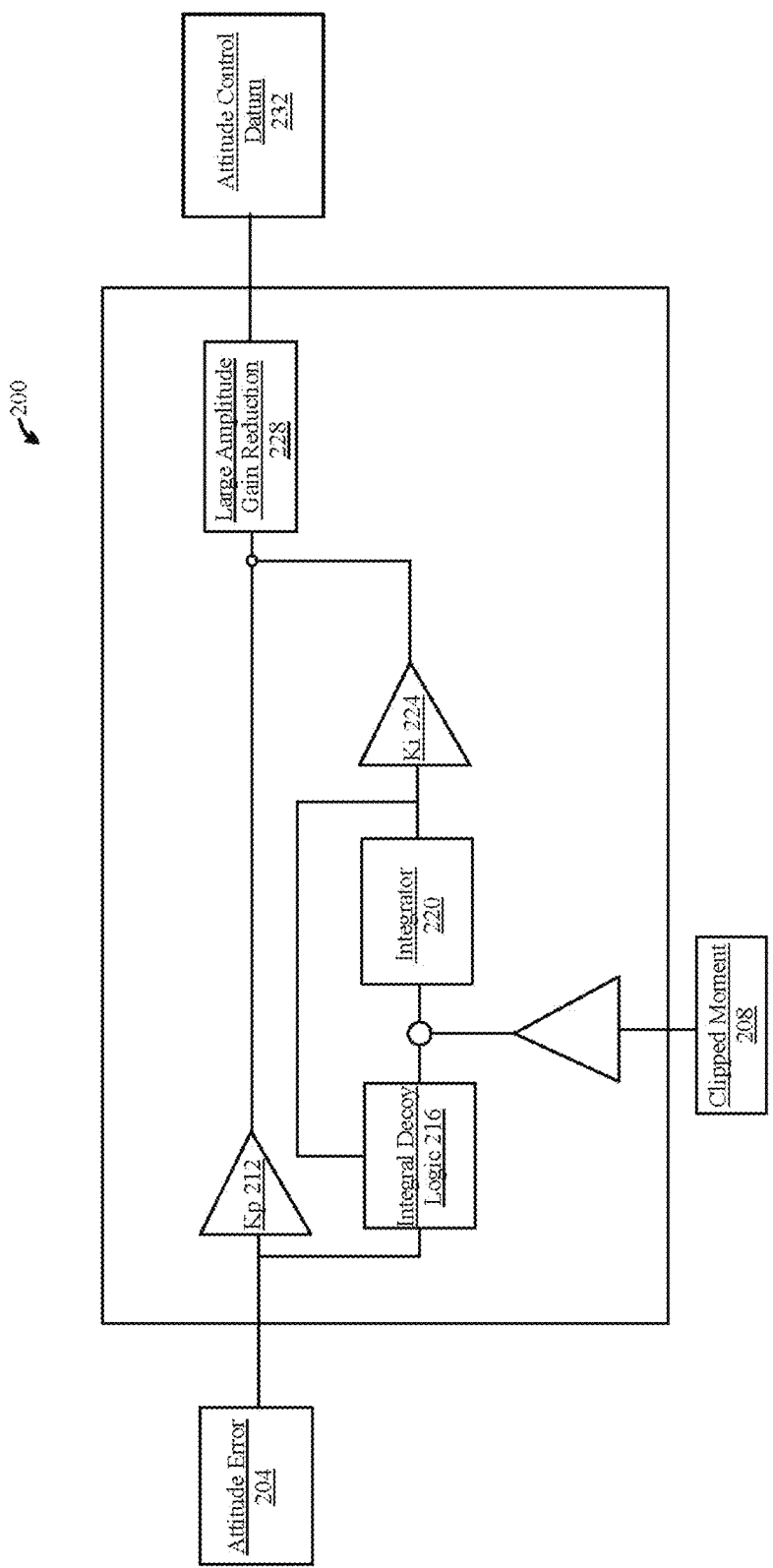
FIG. 2 is an illustrative embodiment of a higher level flight controller for use in embodiments of the present invention.

Referring now to FIG. 2, an illustrative embodiment of a higher level flight controller for use in embodiments of the present invention. Higher level flight controller may include an outer loop flight controller 200. The outer loop flight controller may be considered as a higher level flight controller. The outer loop flight controller 200 may include any flight controller described in the entirety of this disclosure. outer loop controller 200 is presented in block diagram form. Outer loop controller 200 may be configured to control a position and velocity of an electric aircraft or electric vehicle. Outer loop controller 200 may be consistent with any outer loop controller as described herein. Outer loop controller 200 may include attitude error 204. Attitude error 204 may include a measurement of the difference between the commanded at least an aircraft angle 116 and the actual angle of the aircraft in any of pitch, roll, yaw, or a combination thereof. The attitude error 204 may include a percentage, measurement in degrees, measurement in radians, or one or more representations of a difference in commanded aircraft angle as a function of input datum 104 and actual angle of aircraft in the aforementioned attitudes. Attitude error 204 may include measurements as detected by one or more sensors configured to measure aircraft angle like an IMU, gyroscope, motion sensor, optical sensor, a combination thereof, or another sensor of combination of sensors. Outer loop controller 200 may include clipped moment 208 as an input to controller. Clipped moment 208 may include one or more elements of data that have been selected from a larger sample size or range. Clipped moment 208 may have been selected for its lack of noise, improved efficiency, or accuracy of moment associated with any one or more elements of an electric aircraft consistent with the entirety of this disclosure. Gain may be a linear operation. Gain compression may be not linear and, as such, its effect may be one of distortion, due to the nonlinearity of the transfer characteristic which also causes a loss of 'slope' or 'differential' gain. So, the output may be less than expected using the small signal gain of the amplifier. In clipping, the signal may be abruptly limited to a certain amplitude and may be thereby distorted in keeping under that level. This creates extra harmonics that are not present in the original signal. "Soft" clipping or limiting means there isn't a sharp "knee point" in the transfer characteristic. A sine wave that has been softly clipped will become more like a square wave with more rounded edges, but will still have many extra harmonics. Outer loop controller 200 may include Kp operational amplifier 212. Kp op amp 212 may include one or more constants configured to scale any one or more signals in any control loop or otherwise computing devices for use in controlling aspects of an electric aircraft. Outer loop controller 200 may include integral decoy logic 216. Outer loop controller 200 may include integrator 220. Integrator 220 may include an operational amplifier configured to perform a mathematical operation of integration of a signal; output voltage may be proportional to input voltage integrated over time. An input current may be offset by a negative feedback current flowing in the capacitor, which may be generated by an increase in output voltage of the amplifier. The output voltage may be therefore dependent on the value of input current it has to offset and the inverse of the value of the feedback capacitor. The greater the capacitor value, the less output voltage has to be generated to produce a particular feedback current flow. The input impedance of the circuit may be almost zero because of the Miller effect. Hence all the stray capacitances (the cable capacitance, the amplifier input capacitance, etc.) are virtually grounded and they have no influence on the output signal. Operational amplifier as used in integrator may be used as part of a positive or negative feedback amplifier or as an adder or subtractor type circuit using just pure resistances in both the input and the feedback loop. As its name implies, the Op-amp Integrator is an operational amplifier circuit that causes the output to respond to changes in the input voltage over time as the op-amp produces an output voltage which may be proportional to the integral of the input voltage. In other words, the magnitude of the output signal may be determined by the length of time a voltage may be present at its input as the current through the feedback loop charges or discharges the capacitor as the required negative feedback occurs through the capacitor. Input voltage may be Vin and represent the input signal to controller such as one or more of input datum 104 and/or attitude error 204. Output voltage Vout may represent output voltage such as one or more outputs like attitude control datum 232 which may include a rate setpoint. When a step voltage, Vin may be firstly applied to the input of an integrating amplifier, the uncharged capacitor C has very little resistance and acts a bit like a short circuit allowing maximum current to flow via the input resistor, Rin as potential difference exists between the two plates. No current flows into the amplifiers input and point X may be a virtual earth resulting in zero output. As the impedance of the capacitor at this point may be very low, the gain ratio of XC/RIN may be also very small giving an overall voltage gain of less than one, (voltage follower circuit). As the feedback capacitor, C begins to charge up due to the influence of the input voltage, its impedance Xc slowly increase in proportion to its rate of charge. The capacitor charges up at a rate determined by the RC time constant, of the series RC network. Negative feedback forces the op-amp to produce an output voltage that maintains a virtual earth at the op-amp's inverting input. Since the capacitor may be connected between the op-amp's inverting input (which may be at virtual ground potential) and the op-amp's output (which may be now negative), the potential voltage, Vc developed across the capacitor slowly increases causing the charging current to decrease as the impedance of the capacitor increases. This results in the ratio of Xc/Rin increasing producing a linearly increasing ramp output voltage that continues to increase until the capacitor may be fully charged. At this point the capacitor acts as an open circuit, blocking any more flow of DC current. The ratio of feedback capacitor to input resistor (XC/RIN) may be now infinite resulting in infinite gain. The result of this high gain (similar to the op-amps open-loop gain) may be that the output of the amplifier goes into saturation as shown below. (Saturation occurs when the output voltage of the amplifier swings heavily to one voltage supply rail or the other with little or no control in between). The rate at which the output voltage increases (the rate of change) may be determined by the value of the resistor and the capacitor, "RC time constant". By changing this RC time constant value, either by changing the value of the Capacitor, C or the Resistor, R, the time in which it takes the output voltage to reach saturation can also be changed for example. Outer loop controller 200 may include a double integrator, consistent with the description of an integrator with the entirety of this disclosure. Single or double integrators consistent with the entirety of this disclosure may include analog or digital circuit components. Outer loop controller 200 may include Ki operational amplifier 224. Ki op amp 224 may be a unique constant configured to scale any one or more signals or data as described herein with reference to kp op amp 212. Outer loop controller 200 may include large amplitude gain reduction 228. Large amplitude gain reduction 228 may be configured to reduce gain on large amplitude input signals consistent with the above description. Compression of gain may be caused by non-linear characteristics of the device when run at large amplitudes. With any signal, as the input level may be increased beyond the linear range of the amplifier, gain compression will occur. A transistor's operating point may move with temperature, so higher power output may lead to compression due to collector dissipation. But it may be not a change in gain; it may be non-linear distortion. The output level stays relatively the same as the input level goes higher. Once the non-linear portion of the transfer characteristic of any amplifier may be reached, any increase in input will not be matched by a proportional increase in output. Thus, there may be compression of gain. Also, at this time because the transfer function may be no longer linear, harmonic distortion will result. In intentional compression (sometimes called automatic gain control or audio level compression as used in devices called 'dynamic range compressors', the overall gain of the circuit may be actively changed in response to the level of the input over time, so the transfer function remains linear over a short period of time. A sine wave into such a system will still look like a sine wave at the output, but the overall gain may be varied, depending on the level of that sine wave. Above a certain input level, the output sine wave will always be the same amplitude. The output level of Intentional compression varies over time, in order to minimize non-linear behavior. With gain compression, the opposite may be true, its output may be constant. In this respect intentional compression serves less of an artistic purpose.

With continued reference to FIG. 2, a flight assembly 140 may determine whether a higher level flight controller, at least a modular flight controller, or at least a central flight controllers has switched modes or if an indication to switch modes is received. In a non-limiting embodiment, an indication to switch modes may be received by a pilot or a higher level flight computer. For instance, a higher level flight computer may automatically switch the lower level flight computers from automatic to a manual mode in the event the higher level flight computer detects that the higher level flight computer is compromised. The mode may be automatically switched from manual to higher level flight computer mode in the event no signals are received from a pilot's aircraft controls for a period of time. In a non-limiting embodiment, pilot control inputs may be first inputted to the higher level flight computer while in manual mode. The higher level flight computer may enhance the pilot instructions before commands are given to the lower level flight computers. For instance, a pilot may let go of all pilot controls when the aircraft is desired to remain motionless in its current position. The higher level flight controller may perform altitude control and prevent the aircraft from drifting in position. Using the higher level flight controller during manual mode may allow the aircraft's position to be more accurately controlled. However, the distributed flight control may enable pilot inputs to be directly provided to lower level flight computers. As shown, the pilot controls are additionally separately connected to the lower level flight computers. In the event the higher level flight computer fails, a pilot is able to directly provide inputs to the lower level flight computers. In a non-limiting embodiment, electronic speed controllers and battery management systems of the distributed flight control system may be connected via Ethernet. In some embodiments, the electronic speed controllers and battery management systems provide information over the Ethernet network regarding a state of a battery, an amount of heat being produced, or any other appropriate information. The lower level flight computers may also be part of the network. The components may plug into an Ethernet switch. A Wi-Fi radio may be connected to the Ethernet network and provide information on components of the distributed flight control system to the pilot or to ground. A person of ordinary skill in the art, after viewing the entirety of this disclosure, would appreciate the implementation of manual mode in the context of distributed flight control system.

Figure 3:
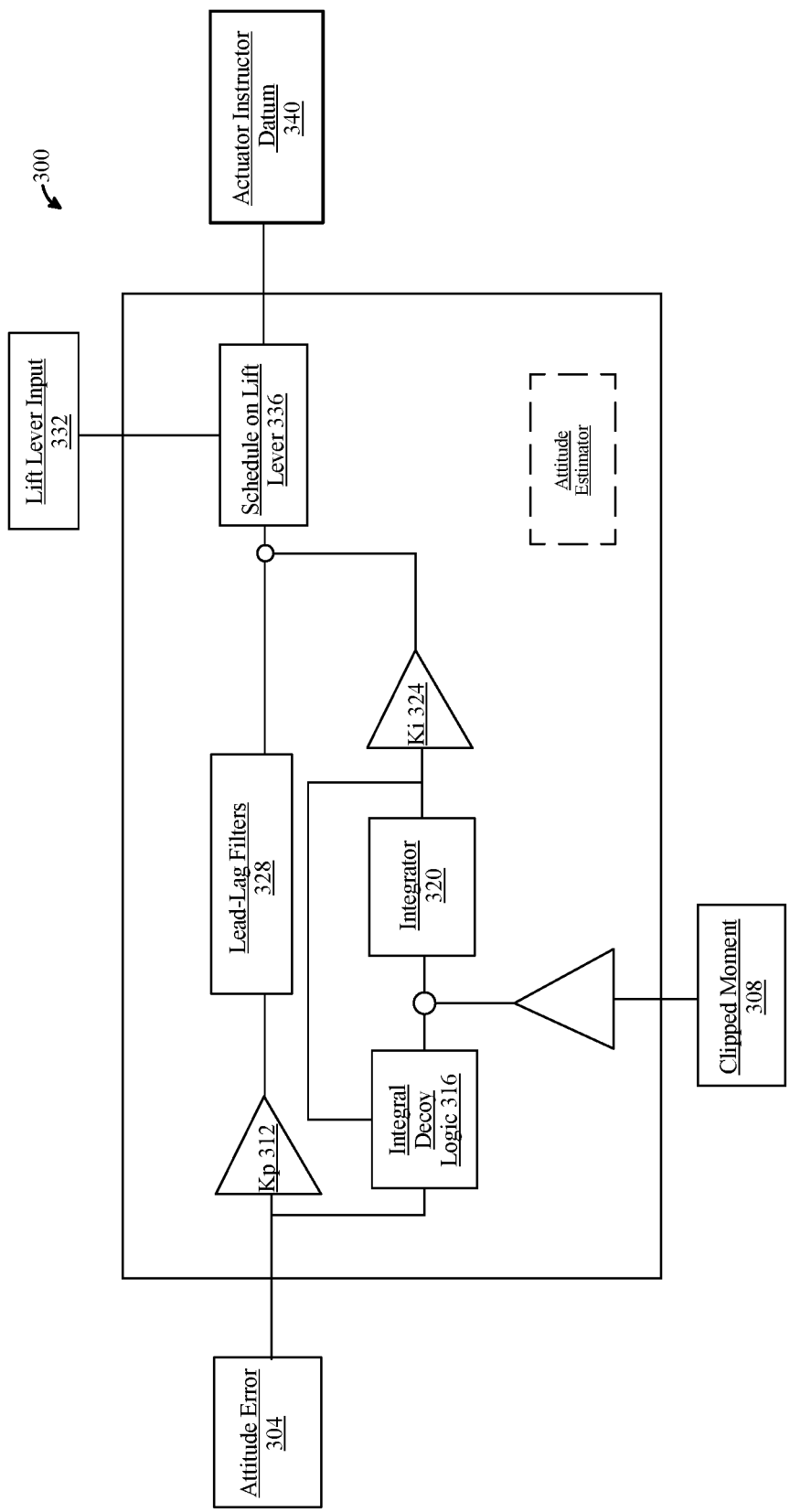
FIG. 3 is an illustrative embodiment of a modular flight controller for use in embodiments of the present invention.

Referring now to FIG. 3, an illustrative embodiment of a modular flight controller for use in embodiments of the present invention. Modular flight controller may include an inner loop flight controller 300 from a plurality of inner loop flight controllers and may include clipped moment 308 as an input to controller. Inner loop flight controller 200 may be considered a lower level flight controller. Gain may be a linear operation. Gain compression may be not linear and, as such, its effect may be one of distortion, due to the nonlinearity of the transfer characteristic which also causes a loss of 'slope' or 'differential' gain. So, the output may be less than expected using the small signal gain of the amplifier. In clipping, the signal may be abruptly limited to a certain amplitude and may be thereby distorted in keeping under that level. This creates extra harmonics that are not present in the original signal. "Soft" clipping or limiting means there isn't a sharp "knee point" in the transfer characteristic. A sine wave that has been softly clipped will become more like a square wave with more rounded edges but will still have many extra harmonics. Inner loop controller 300 may include Kp operational amplifier 312. Inner loop controller 300 may include integral decoy logic 316. Inner loop controller 300 may include integrator 320. Integrator 320 may include an operational amplifier configured to perform a mathematical operation of integration of a signal; output voltage may be proportional to input voltage integrated over time. An input current may be offset by a negative feedback current flowing in the capacitor, which may be generated by an increase in output voltage of the amplifier. The output voltage may be therefore dependent on the value of input current it has to offset and the inverse of the value of the feedback capacitor. The greater the capacitor value, the less output voltage has to be generated to produce a particular feedback current flow. The input impedance of the circuit almost zero because of the Miller effect. Hence all the stray capacitances (the cable capacitance, the amplifier input capacitance, etc.) are virtually grounded and they have no influence on the output signal. Operational amplifier as used in integrator may be used as part of a positive or negative feedback amplifier or as an adder or subtractor type circuit using just pure resistances in both the input and the feedback loop. As its name implies, the Op-amp Integrator is an operational amplifier circuit that causes the output to respond to changes in the input voltage over time as the op-amp produces an output voltage which may be proportional to the integral of the input voltage. In other words, the magnitude of the output signal may be determined by the length of time a voltage may be present at its input as the current through the feedback loop charges or discharges the capacitor as the required negative feedback occurs through the capacitor. Input voltage may be Vin and represent the input signal to controller such as one or more of input datum 104 and/or attitude error 304. Output voltage Vout may represent output voltage such as one or more outputs like attitude control datum 232. When a step voltage, Vin may be firstly applied to the input of an integrating amplifier, the uncharged capacitor C has very little resistance and acts a bit like a short circuit allowing maximum current to flow via the input resistor, Rin as potential difference exists between the two plates. No current flows into the amplifiers input and point X may be a virtual earth resulting in zero output. As the impedance of the capacitor at this point may be very low, the gain ratio of $X_C/R_{in}$ may be also very small giving an overall voltage gain of less than one, (voltage follower circuit). As the feedback capacitor, C begins to charge up due to the influence of the input voltage, its impedance Xc slowly increase in proportion to its rate of charge. The capacitor charges up at a rate determined by the RC time constant, ($\tau$) of the series RC network. Negative feedback forces the op-amp to produce an output voltage that maintains a virtual earth at the op-amp's inverting input. Since the capacitor may be connected between the op-amp's inverting input (which may be at virtual ground potential) and the op-amp's output (which may be now negative), the potential voltage, $V_C$ developed across the capacitor slowly increases causing the charging current to decrease as the impedance of the capacitor increases. This results in the ratio of Xc/Rin increasing producing a linearly increasing ramp output voltage that continues to increase until the capacitor may be fully charged. At this point the capacitor acts as an open circuit, blocking any more flow of DC current. The ratio of feedback capacitor to input resistor ($X_C/R_{IN}$) may be now infinite resulting in infinite gain. The result of this high gain, similar to the op-amps open-loop gain, may be that the output of the amplifier goes into saturation as shown below. (Saturation occurs when the output voltage of the amplifier swings heavily to one voltage supply rail or the other with little or no control in between). The rate at which the output voltage increases (the rate of change) may be determined by the value of the resistor and the capacitor, "RC time constant." By changing this RC time constant value, either by changing the value of the Capacitor, C or the Resistor, R, the time in which it takes the output voltage to reach saturation can also be changed for example. Inner loop controller 300 may include a double integrator, consistent with the description of an integrator with the entirety of this disclosure. Single or double integrators consistent with the entirety of this disclosure may include analog or digital circuit components. Inner loop controller 300 may include Ki operational amplifier 324. Inner loop controller 300 may include lead-lag filters 328 consistent with the description of lead-lag filters herein below. Inner loop controller 300 may include lift lever input 332. Inner loop controller 300 may include schedule on lift lever 336. Schedule on lift lever 336 may be configured determine and output an actuator instruction datum 340 wherein the actuator instruction datum may include any actuator instruction datum described herein.

Inner loop controller 300 may include pitch rate damping. Adding pitch rate damping with the elevators may be the least intrusive form of augmentation that has been suggested. In this scheme, the elevator input may be a sum of the pilot input (as in fully manual flight) and a component that arrests pitch rate as measured by the IMU's such as IMU 112. The scheduling on the lift lever may be such that in forward flight (with 0 assisted lift), the full damping may be active. As the lift lever rises above some value (set to 0.1), the damping rolls off so that very low airspeed behavior may be handled entirely by the attitude controller. The higher this value may be set, the more active the elevator damping will be at low-speed flight (i.e., flight with substantial assisted lift). The saturation on the damping term ensures that the pilot has some amount of control authority regardless of what the augmentation attempts to do. With this design, as with the baseline design, there may be no blending between modes required during acceleration from lift assisted flight to fully wing-borne flight. Additionally, there may be no control discontinuity as the lift fans turn off and stow.

With continued reference to FIG. 3, the inner loop flight controller may receive from a higher level flight controller an attitude control datum that may include a desired attitude and a pilot desired attitude. In a non-limiting embodiment, inner loop flight controller may include a switch that may determine on desired attitude to pass on to summation block based on whether the flight control system is in manual mode or automatic mode. Summation block may receive a desired attitude and an attitude estimate and determine an attitude error, or difference between the two. The attitude estimate may be an estimate of the aircraft's actual attitude. Attitude controller may receive the attitude error and produces actuator commands for the aircraft based on the attitude error. The commands may be determined to eliminate the attitude error. Actuator commands are provided to safety block. Safety block may prevent commands from being sent to actuators in the event the aircraft is already landed, in a take-off sequence, or in a landing sequence. In the event the aircraft is prepared to receive actuator commands, actuator commands are provided by the safety block to aircraft. The aircraft's actuators may provide information on their state to sensors. For example, a signal may be sent that the actuators changed position. In some embodiments, the aircraft's actuators change position based on received commands and the sensors detect the change in position. Information may not be explicitly sent from the aircraft to sensors. In a non-limiting embodiment, at least a sensors may provide sensor data to an attitude estimator configured to process the sensor data received. For instance, the attitude estimator may disregard signal noise. Attitude estimator may determine an estimate of the aircraft's attitude based on the sensor data. Attitude estimator may provide an attitude estimate to flight control assembly. In some embodiments, the switch and the safety block are executed by one software block, for example, a state machine or central flight controller.

Figure 4:
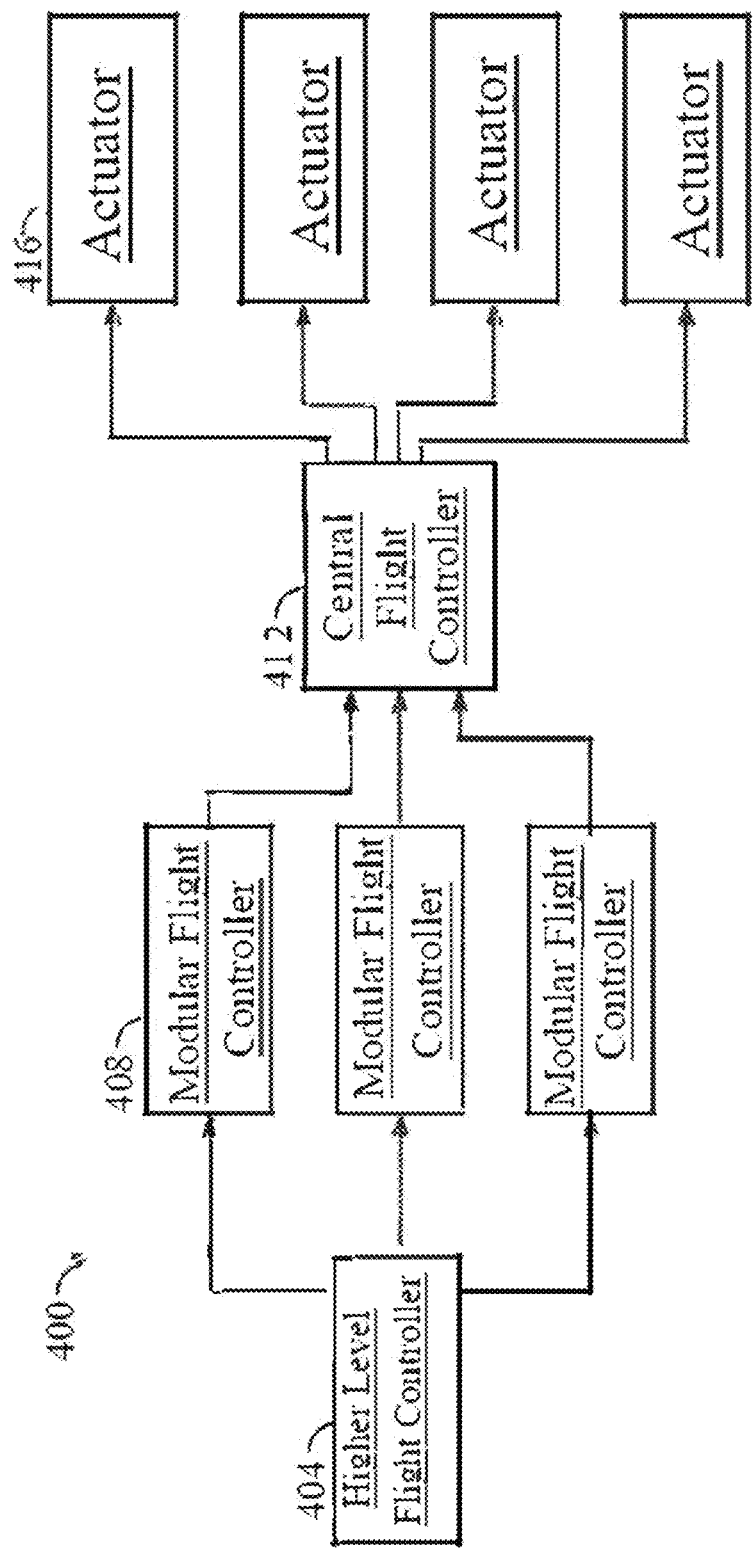
FIG. 4 is an illustrative embodiment of a redundant flight control assembly.

Referring now to FIG. 4, an illustrative embodiment of a redundant flight control assembly is presented. System 400 may include a triplex redundant flight control system uses three modular flight controllers 408 to provide redundancy. In a non-limiting embodiment, higher level flight controller 404 may generate an attitude control datum as an input to each modular flight controller 408. In a non-limiting embodiment, each modular flight controller 408 provides information to central flight controller 412. The modular flight controllers 408 may each separately determine instructions for each actuator 416 of the aircraft. Central flight controller 412 may be used to determine which instructions to provide to the actuator 416s. Central flight controller 412 may use a voting scheme. For example, in the event modular flight controller 408 and modular flight controller 408 produced a same instruction for actuator 416 but modular flight controller 408 did not, central flight controller 412 may pass on the instruction that a majority of the modular flight controllers 408 agreed upon. In the example shown, central flight controller 412 provides instructions to each actuator. In a non-limiting embodiment, the redundant flight control system 400 may provide redundancy in the aircraft's autopilot and eliminate single points of failure. However, the system may be complex or costly to implement. Central flight controller 412 may comprise complex hardware or software. Central flight controller 412 may require redundant elements in its hardware or software. The system's hardware or software may be required to be designed from beginning to end with redundancy in mind.

Figure 5:
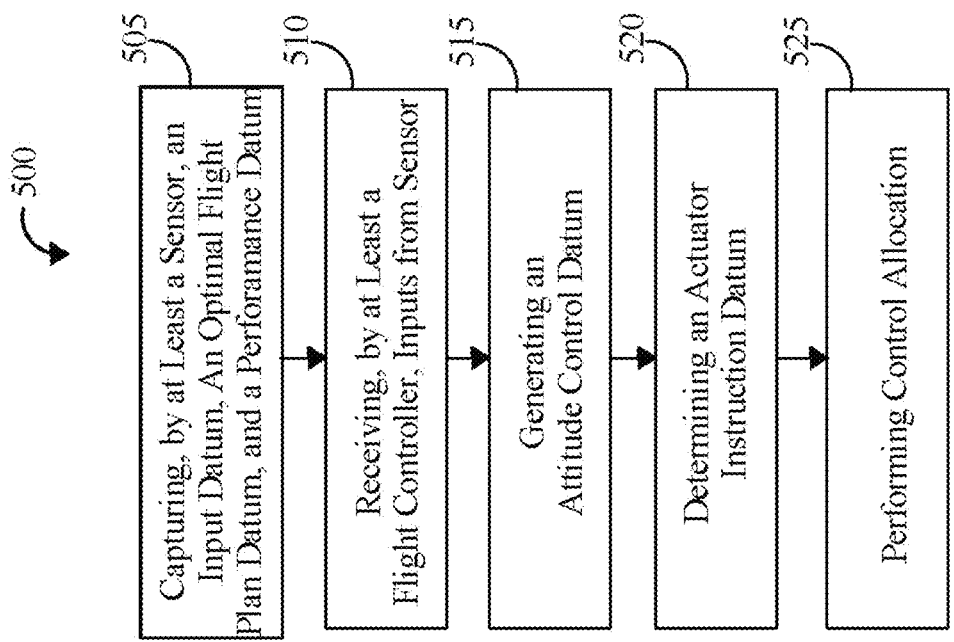
FIG. 5 is an exemplary method of a flight control assembly configured for use in an electric aircraft in block diagram form.

Referring now to FIG. 5, an exemplary method 500 of a flight control assembly configured for use in an electric aircraft in block diagram form is presented. Method 500 includes step 505 which includes capturing, by at least a sensor 104, at least an input datum 108, at least an optimal flight plan 112, and at least a performance datum 116. At least a sensor 104 may include any sensor as described herein. At least an input datum 108 may include any input datum as described herein. At least a performance datum 116 may include any performance datum described herein.

Still referring to FIG. 5, method 500 includes step 510 which includes receiving by at least a flight controller, the plurality of inputs from the at least a sensor 104. Receiving the plurality of inputs includes receiving the at least an input datum 108, the at least an optimal flight plan datum 12, the at least a performance datum 116, and at least an outside parameter. Outside parameter may include any outside parameter as described herein. Flight controller may include a flight control assembly 140 wherein the flight control assembly may include any flight control assembly as described herein. The receiving of the plurality of inputs may include at least a higher level flight controller 124 and/or at least a modular flight controller 132 receiving the plurality of data.

Still referring to FIG. 5, method 500 includes step 515 which includes generating an attitude control datum 128. Attitude control datum 128 may include any attitude control datum as described herein. Step 515 may further include estimating an attitude of an electric vehicle and determine an attitude difference between the estimation and a desired attitude parameter of the electric vehicle. Attitude difference may include, but not limited to, a numerical range, value, or threshold. Generating the attitude control datum 128 may further determining a set of commands to change the attitude of an electric vehicle to match the desired attitude parameter. Step 515 may include the use of a machine-learning model.

Still referring to FIG. 5, method 500 includes step 520 which includes determining an actuator instruction datum 136. Actuator instruction datum 146 may include any actuator instruction datum as described herein. Determining the actuator instruction datum 136 may further include using a machine-learning model. Determining the actuator instruction datum 136 may further include generating individual actuator instruction sets corresponding to each actuator of a plurality of actuators or set of actuators.

Still referring to FIG. 5, method 500 includes step 525 which includes performing a control allocation. Performing a control allocation may include performing a control allocation as a function of a control allocation command 152. Control allocation command 152 may include any control allocation command 152 described herein. Control allocation may include any control allocation described herein. Performing the control allocation may further include transmitting the actuator instruction datum to a corresponding set of actuators for the actuators to follow. A person of ordinary sill in the art, after viewing the entirety of this disclosure, would appreciate the steps to generate an instruction set for a distributed flight control system to command to individual components of an electric vehicle.

Figure 6:
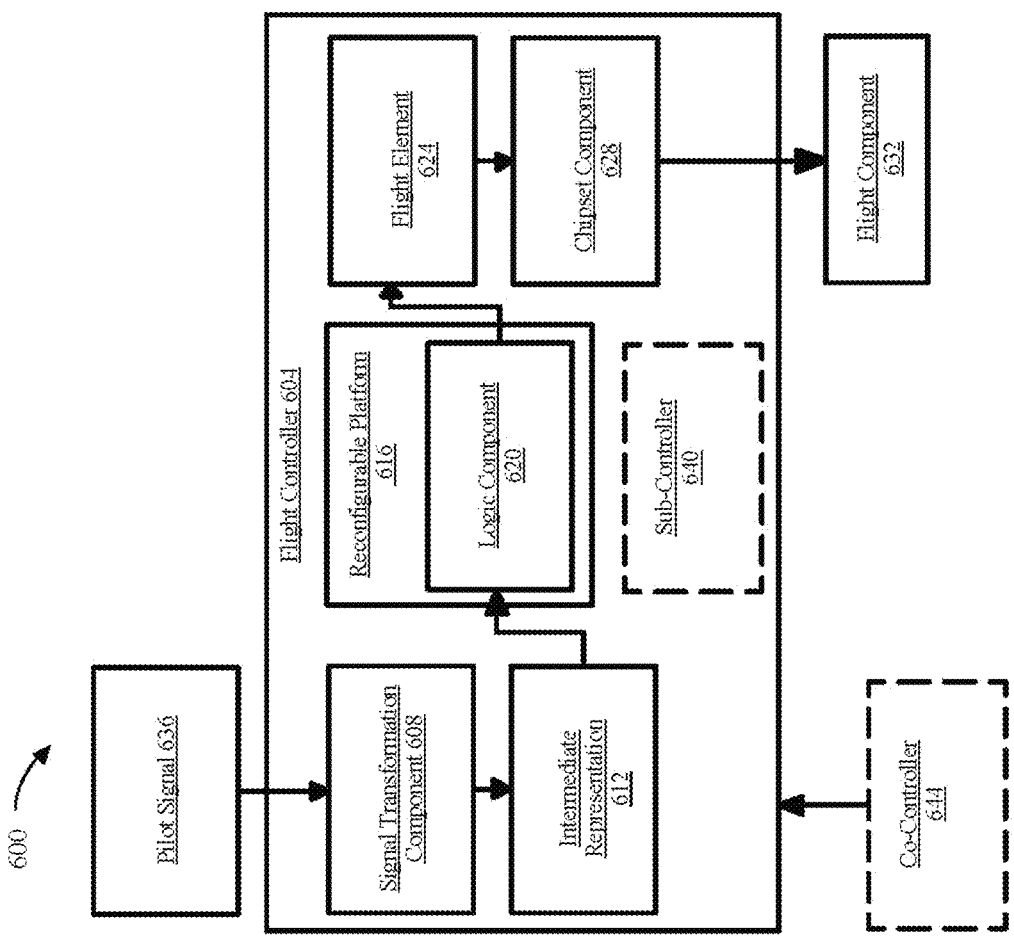
FIG. 6 is a block diagram illustrating a flight controller.

Now referring to FIG. 6, an exemplary embodiment 600 of a flight controller 604 is illustrated. Flight controller 604 may include and/or communicate with any computing device as described in this disclosure, including without limitation a microcontroller, microprocessor, digital signal processor (DSP) and/or system on a chip (SoC) as described in this disclosure. Further, flight controller 604 may include a single computing device operating independently, or may include two or more computing device operating in concert, in parallel, sequentially or the like; two or more computing devices may be included together in a single computing device or in two or more computing devices. In embodiments, flight controller 604 may be installed in an aircraft, may control the aircraft remotely, and/or may include an element installed in the aircraft and a remote element in communication therewith.

In an embodiment, and still referring to FIG. 6, flight controller 604 may include a signal transformation component 608. As used in this disclosure a "signal transformation component" is a component that transforms and/or converts a first signal to a second signal, wherein a signal may include one or more digital and/or analog signals. For example, and without limitation, signal transformation component 608 may be configured to perform one or more operations such as preprocessing, lexical analysis, parsing, semantic analysis, and the like thereof. In an embodiment, and without limitation, signal transformation component 608 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 608 may include transforming one or more low-level languages such as, but not limited to, machine languages and/or assembly languages. For example, and without limitation, signal transformation component 608 may include transforming a binary language signal to an assembly language signal. In an embodiment, and without limitation, signal transformation component 608 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 6, signal transformation component 608 may be configured to optimize an intermediate representation 612. As used in this disclosure an "intermediate representation" is a data structure and/or code that represents the input signal. Signal transformation component 608 may optimize intermediate representation as a function of a data-flow analysis, dependence analysis, alias analysis, pointer analysis, escape analysis, and the like thereof. In an embodiment, and without limitation, signal transformation component 608 may optimize intermediate representation 612 as a function of one or more inline expansions, dead code eliminations, constant propagation, loop transformations, and/or automatic parallelization functions. In another embodiment, signal transformation component 608 may optimize intermediate representation as a function of a machine dependent optimization such as a peephole optimization, wherein a peephole optimization may rewrite short sequences of code into more efficient sequences of code. Signal transformation component 608 may optimize intermediate representation to generate an output language, wherein an "output language," as used herein, is the native machine language of flight controller 604. For example, and without limitation, native machine language may include one or more binary and/or numerical languages.

In an embodiment, and without limitation, signal transformation component 608 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 6, flight controller 604 may include a reconfigurable hardware platform 616. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 616 may be reconfigured to enact any algorithm and/or algorithm selection process received from another computing device and/or created using machine-learning processes.

Still referring to FIG. 6, reconfigurable hardware platform 616 may include a logic component 620. As used in this disclosure a "logic component" is a component that executes instructions on output language. For example, and without limitation, logic component may perform basic arithmetic, logic, controlling, input/output operations, and the like thereof. Logic component 620 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 620 may be organized according to Von Neumann and/or Harvard architecture as a non-limiting example. Logic component 620 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 620 may include one or more integrated circuit microprocessors, which may contain one or more central processing units, central processors, and/or main processors, on a single metal-oxide-semiconductor chip. Logic component 620 may be configured to execute a sequence of stored instructions to be performed on the output language and/or intermediate representation 612. Logic component 620 may be configured to fetch and/or retrieve the instruction from a memory cache, wherein a "memory cache," as used in this disclosure, is a stored instruction set on flight controller 604. Logic component 620 may be configured to decode the instruction retrieved from the memory cache to opcodes and/or operands. Logic component 620 may be configured to execute the instruction on intermediate representation 612 and/or output language. For example, and without limitation, logic component 620 may be configured to execute an addition operation on intermediate representation 612 and/or output language.

In an embodiment, and without limitation, logic component 620 may be configured to calculate a flight element 624. As used in this disclosure a "flight element" is an element of datum denoting a relative status of aircraft. For example, and without limitation, flight element 624 may denote one or more torques, thrusts, airspeed velocities, forces, altitudes, groundspeed velocities, directions during flight, directions facing, forces, orientations, and the like thereof. For example, and without limitation, flight element 624 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 624 may denote that aircraft is following a flight path accurately and/or sufficiently.

Still referring to FIG. 6, flight controller 604 may include a chipset component 628. As used in this disclosure a "chipset component" is a component that manages data flow. In an embodiment, and without limitation, chipset component 628 may include a northbridge data flow path, wherein the northbridge dataflow path may manage data flow from logic component 620 to a high-speed device and/or component, such as a RAM, graphics controller, and the like thereof. In another embodiment, and without limitation, chipset component 628 may include a southbridge data flow path, wherein the southbridge dataflow path may manage data flow from logic component 620 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally, or alternatively, chipset component 628 may manage data flow between logic component 620, memory cache, and a flight component 632. As used in this disclosure a "flight component" is a portion of an aircraft that can be moved or adjusted to affect one or more flight elements. For example, flight component 732 may include a component used to affect the aircrafts' roll and pitch which may comprise one or more ailerons. As a further example, flight component 632 may include a rudder to control yaw of an aircraft. In an embodiment, chipset component 628 may be configured to communicate with a plurality of flight components as a function of flight element 624. For example, and without limitation, chipset component 628 may transmit to an aircraft rotor to reduce torque of a first lift propulsor and increase the forward thrust produced by a pusher component to perform a flight maneuver.

Still referring to FIG. 6, flight controller may include a sub-controller 640. As used in this disclosure a "sub-controller" is a controller and/or component that is part of a distributed controller as described above; for instance, flight controller 604 may be and/or include a distributed flight controller made up of one or more sub-controllers. For example, and without limitation, sub-controller 640 may include any controllers and/or components thereof that are similar to distributed flight controller and/or flight controller as described above. Sub-controller 640 may include any component of any flight controller as described above. Sub-controller 640 may be implemented in any manner suitable for implementation of a flight controller as described above. As a further non-limiting example, sub-controller 640 may include one or more processors, logic components and/or computing devices capable of receiving, processing, and/or transmitting data across the distributed flight controller as described above. As a further non-limiting example, sub-controller 640 may include a controller that receives a signal from a first flight controller and/or first distributed flight controller component and transmits the signal to a plurality of additional sub-controllers and/or flight components.

Still referring to FIG. 6, flight controller may include a co-controller 644. As used in this disclosure a "co-controller" is a controller and/or component that joins flight controller 604 as components and/or nodes of a distributer flight controller as described above. For example, and without limitation, co-controller 644 may include one or more controllers and/or components that are similar to flight controller 604. As a further non-limiting example, co-controller 644 may include any controller and/or component that joins flight controller 604 to distributer flight controller. As a further non-limiting example, co-controller 644 may include one or more processors, logic components and/or computing devices capable of receiving, processing, and/or transmitting data to and/or from flight controller 604 to distributed flight control system. Co-controller 644 may include any component of any flight controller as described above. Co-controller 644 may be implemented in any manner suitable for implementation of a flight controller as described above.

In an embodiment, and with continued reference to FIG. 6, flight controller 604 may be designed and/or configured to perform any method, method step, or sequence of method steps in any embodiment described in this disclosure, in any order and with any degree of repetition. For instance, flight controller 604 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 6, flight controller 604 may also be implemented using a "shared nothing" architecture in which data is cached at the worker, in an embodiment, this may enable scalability of aircraft and/or computing device. Flight controller 604 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks.

Figure 7:
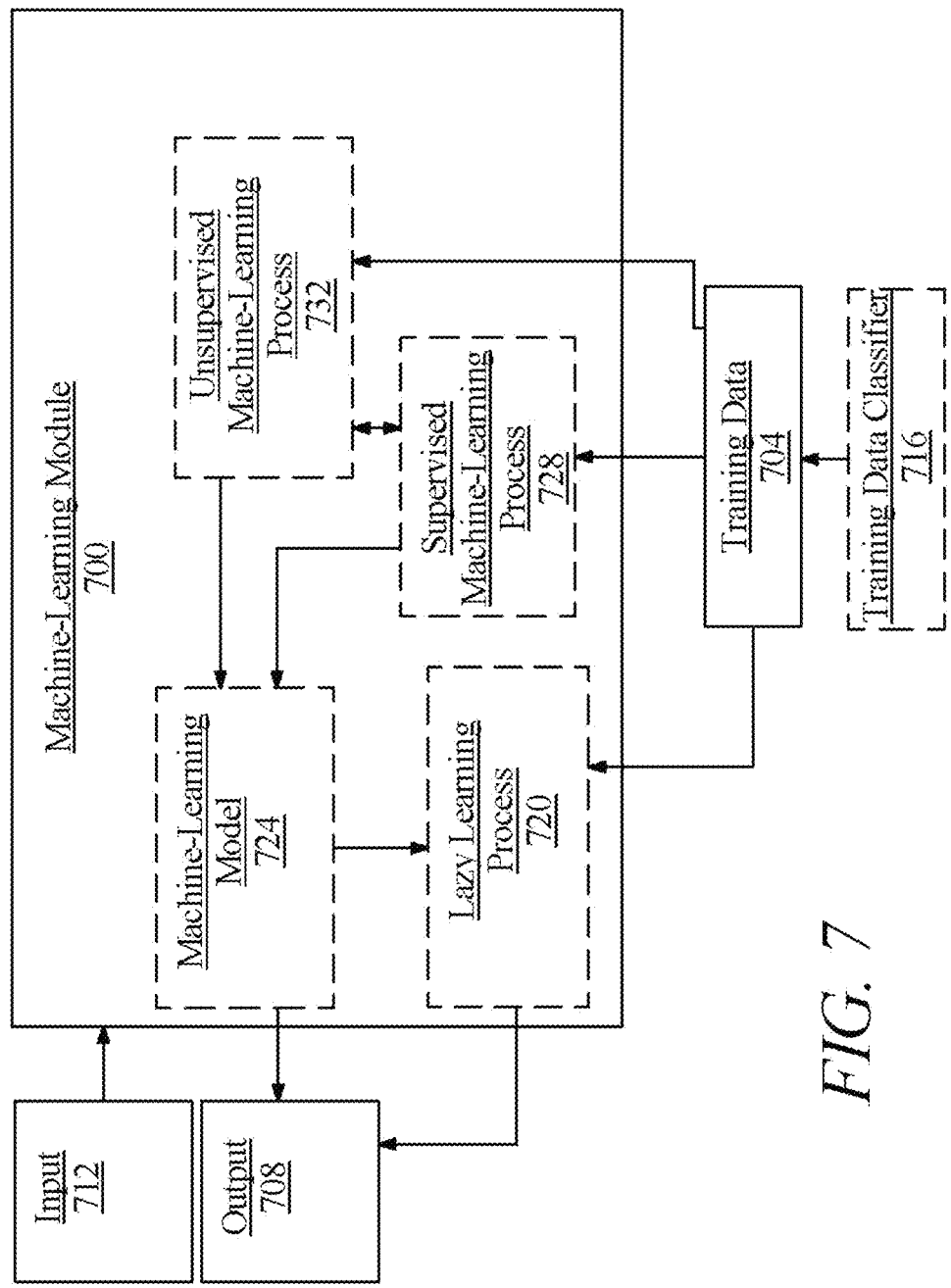
FIG. 7 is block diagram of an exemplary embodiment of a machine learning module.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example a plurality of data including an input datum 108, optimal flight plan datum 112, a performance datum 116, an outside parameter, and the like may be inputs and an attitude control datum 128, actuator instruction datum 136 priority command datum 144 or control allocation command 152 may be outputs. In another example, attitude control datum 128, actuator instruction datum or priority command datum 144 may be inputs for the control allocation command 152.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to train or determine a priority data set that may include optimal flight path, shortest flight path, fastest flight path, safest flight path, or a combination thereof.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include an actuator instruction datum, input datum 108, optimal flight plan datum 112, performance datum 116, outside parameters, or a combination thereof as inputs and a priority command datum 144 as an output. In a non-limiting embodiment, priority command datum 144 may be an input and control allocation command 152 may be an output, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 8:
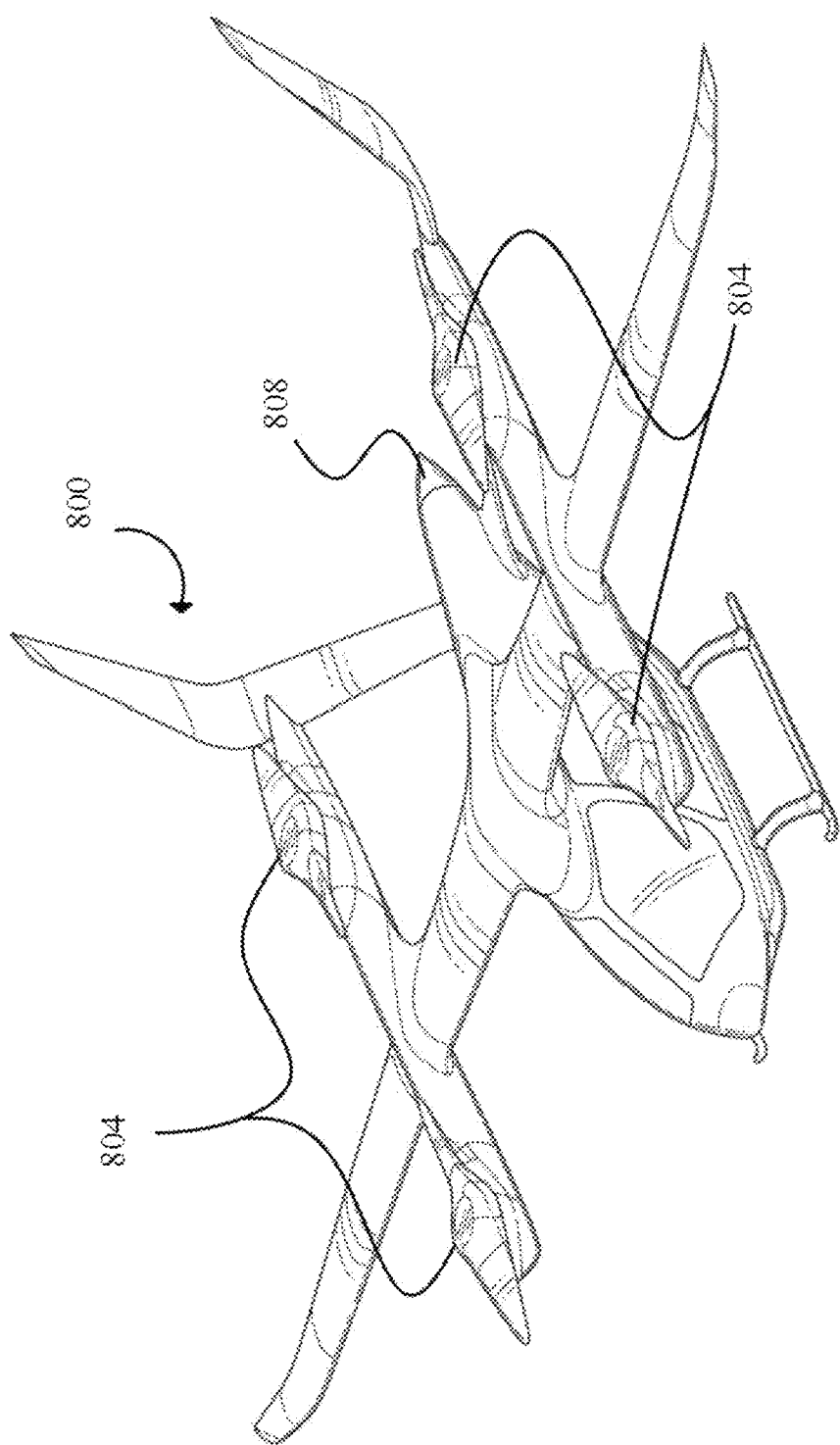
FIG. 8 is an illustrative embodiment of an electric aircraft.

Referring now to FIG. 8, an embodiment of an electric aircraft 800 is presented. Still referring to FIG. 8, electric aircraft 800 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 8, a number of aerodynamic forces may act upon the electric aircraft 800 during flight. Forces acting on an electric aircraft 800 during flight may include, without limitation, thrust, the forward force produced by the rotating element of the electric aircraft 800 and acts parallel to the longitudinal axis. Another force acting upon electric aircraft 800 may be, without limitation, drag, which may be defined as a rearward retarding force which is caused by disruption of airflow by any protruding surface of the electric aircraft 800 such as, without limitation, the wing, rotor, and fuselage. Drag may oppose thrust and acts rearward parallel to the relative wind. A further force acting upon electric aircraft 800 may include, without limitation, weight, which may include a combined load of the electric aircraft 800 itself, crew, baggage, and/or fuel. Weight may pull electric aircraft 800 downward due to the force of gravity. An additional force acting on electric aircraft 800 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 800 are designed to be as lightweight as possible. Reducing the weight of the aircraft and designing to reduce the number of components is essential to optimize the weight. To save energy, it may be useful to reduce weight of components of an electric aircraft 800, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on electric aircraft 800 and/or propulsors.

Referring still to FIG. 8, Aircraft may include at least a vertical propulsor 804 and at least a forward propulsor 808. A forward propulsor is a propulsor that propels the aircraft in a forward direction. Forward in this context is not an indication of the propulsor position on the aircraft; one or more propulsors mounted on the front, on the wings, at the rear, etc. A vertical propulsor is a propulsor that propels the aircraft in an upward direction; one of more vertical propulsors may be mounted on the front, on the wings, at the rear, and/or any suitable location. A propulsor, as used herein, is a component or device used to propel a craft by exerting force on a fluid medium, which may include a gaseous medium such as air or a liquid medium such as water. At least a vertical propulsor 804 is a propulsor that generates a substantially downward thrust, tending to propel an aircraft in a vertical direction providing thrust for maneuvers such as without limitation, vertical take-off, vertical landing, hovering, and/or rotor-based flight such as "quad-copter" or similar styles of flight.

With continued reference to FIG. 8, at least a forward propulsor 808 as used in this disclosure is a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, takeoff, and/or landing, and/or may propel the aircraft forward or backward on the ground. At least a vertical propulsor 804 and at least a forward propulsor 808 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contrarotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft is in compression. Propulsors may include at least a motor mechanically coupled to the at least a first propulsor as a source of thrust. A motor may include without limitation, any electric motor, where an electric motor is a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varying or reversing voltage levels, such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element.

With continued reference to FIG. 8, during flight, a number of forces may act upon the electric aircraft. Forces acting on an aircraft 800 during flight may include thrust, the forward force produced by the rotating element of the aircraft 800 and acts parallel to the longitudinal axis. Drag may be defined as a rearward retarding force which is caused by disruption of airflow by any protruding surface of the aircraft 800 such as, without limitation, the wing, rotor, and fuselage. Drag may oppose thrust and acts rearward parallel to the relative wind. Another force acting on aircraft 800 may include weight, which may include a combined load of the aircraft 800 itself, crew, baggage and fuel. Weight may pull aircraft 800 downward due to the force of gravity. An additional force acting on aircraft 800 may include lift, which may act to oppose the downward force of weight and may be produced by the dynamic effect of air acting on the airfoil and/or downward thrust from at least a propulsor. Lift generated by the airfoil may depends on speed of airflow, density of air, total area of an airfoil and/or segment thereof, and/or an angle of attack between air and the airfoil.

Figure 9:
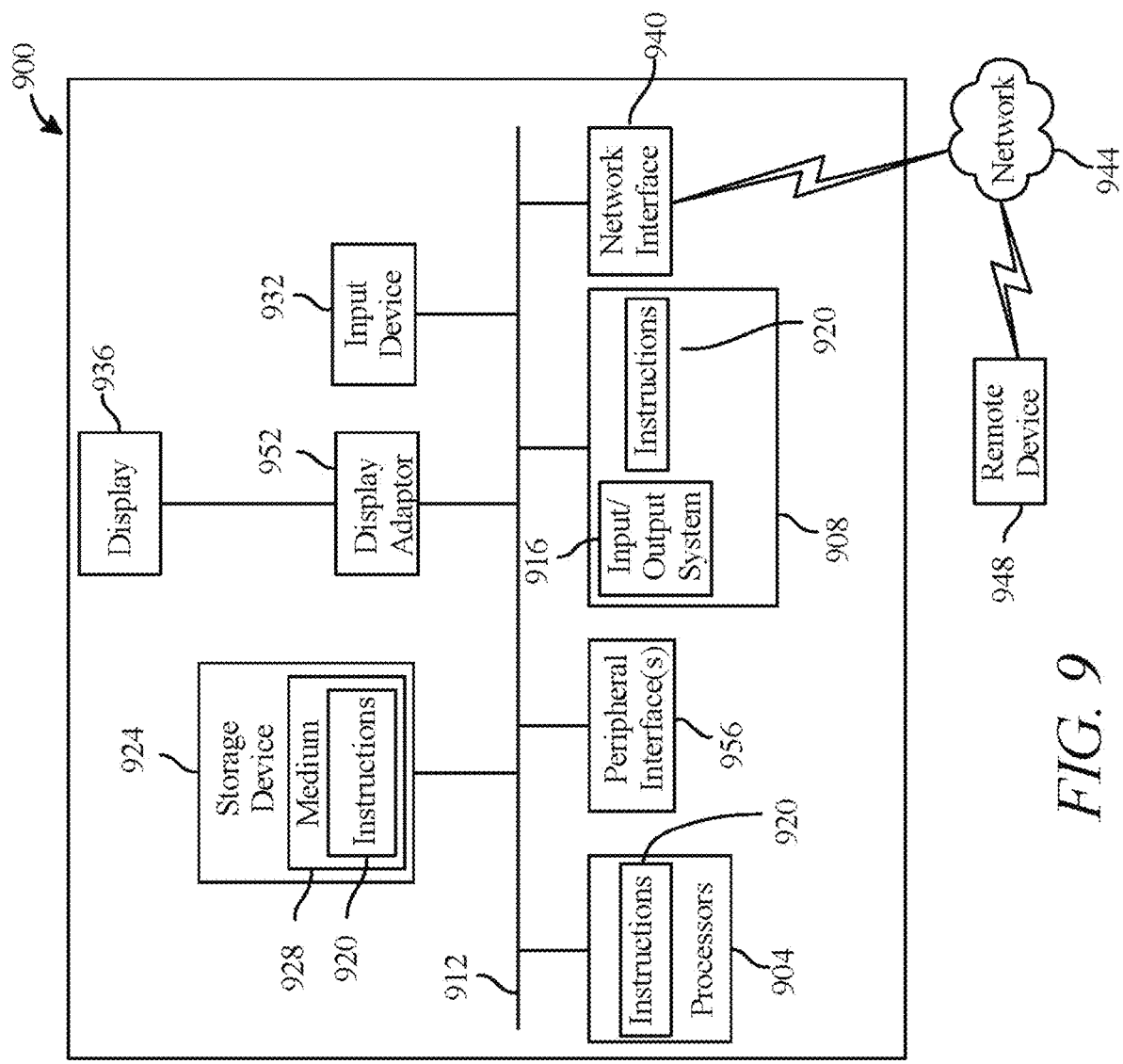
FIG. 9 is a block diagram of a computing system that can be used to implement any one or more of the methodologies disclosed herein and any one or more portions thereof.

Referring now to FIG. 9, an exemplary embodiment of a system 900 for a distributed flight control system such as a flight control assembly configured for use in an electric vehicle is illustrated. System includes a computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 100 and/or computing device.

With continued reference to FIG. 9, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed:

1. A system for distributed flight control configured for use in an electric vehicle, the system comprising:
- a flight control assembly, the flight control assembly comprising:
  - at least a sensor electronically connected to the flight control assembly, the at least a sensor configured to capture at least an input datum and at least a performance datum;
  - a plurality of flight controllers communicatively coupled to a plurality of actuators of an electric vehicle, wherein the plurality of flight controllers is configured to receive the at least an input datum, the at least a performance datum, and at least an optimal flight plan datum, and wherein the plurality of flight controllers comprises:
    - a first flight controller configured to generate an attitude control datum as a function of the at least an input datum, the at least an optimal flight plan datum, and the at least a performance datum, wherein the attitude control datum comprises an element of data for controlling an orientation of the electric vehicle, and wherein generating the attitude control datum further comprises:
      - inputting the at least an input datum, the at least an optimal flight plan datum and the at least a performance datum to a machine-learning model; and
      - outputting, using the machine-learning model, the attitude control datum;
    - a second flight controller configured to determine at least an actuator instruction datum as a function of the attitude control datum, wherein the actuator instruction datum comprises an element of data with at least an instruction for at least one actuator of the plurality of actuators to follow; and
    - a third flight controller configured to perform a control allocation configured for at least one actuator of the plurality of actuators to follow as a function of the at least an actuator instruction datum.

2. The system of claim 1, wherein the third flight controller is further configured to:
- receive a plurality of actuator instruction data from the second flight controller;
- determine a priority command datum as a function of a pilot input; and
- perform a control allocation for at least an actuator to follow as a function of the priority command datum.

3. The system of claim 1, wherein each actuator of the plurality of actuators is electronically connected to the at least a sensor.

4. The system of claim 1, wherein the flight control assembly further comprises an outer loop flight controller.

5. The system of claim 4, wherein the outer loop controller is configured generate a rate setpoint.

6. The system of claim 1, wherein the flight control assembly further comprises an inner loop controller.

7. The system of claim 6, wherein the inner loop controller comprises an attitude controller and an attitude estimator configured to determine the at least an actuator instruction datum of the electric vehicle.

8. The system of claim 1, wherein the control allocation is performed automatically.

9. The system of claim 1, wherein the flight control assembly is further configured to display a plurality of health statuses of the plurality of actuators.

10. The system of claim 1, wherein the control allocation is generated as a function of a second machine-learning model.

11. A method for distributed flight control configured for use in an electric vehicle, the method comprising:
- capturing, by at least a sensor, at least an input datum, at least an optimal flight plan datum, and at least a performance datum;
- receiving, by a plurality of flight controllers communicatively coupled to a plurality of actuators of an electric vehicle, the at least an input datum, the at least an optimal flight plan datum, and the at least a performance datum from the at least a sensor;
- generating, by a first flight controller of the plurality of flight controllers, an attitude control datum as a function of the at least an input datum, the at least an optimal flight plan datum, and the at least a performance datum, wherein the attitude control datum comprises an element of data for controlling an orientation of the electric vehicle, and wherein generating the attitude control datum further comprises:
  - inputting the at least an input datum, the at least an optimal flight plan datum and the at least a performance datum to a machine-learning model; and
  - outputting, using the machine-learning model, the attitude control datum;
- determining, by a second flight controller of the plurality of flight controllers, at least an actuator instruction datum as a function of the attitude control datum, wherein the actuator instruction datum comprises an element of data with at least an instruction for at least one actuator of the plurality of actuators to follow; and
- performing, by a third flight controller of the plurality of flight controllers, a control allocation configured for at least one actuator from the plurality of actuators to follow as a function of the at least an actuator instruction datum.

12. The method of claim 11, wherein the method further comprises:
- receiving, by the third flight controller, a plurality of actuator instruction data from the second flight controller;
- determining, by the third flight controller, a priority command datum as a function of a pilot input; and
- performing, by the third flight controller, a control allocation as a function of the priority command datum.

13. The method of claim 12, wherein performing the control allocation comprises the third flight controller performing the control allocation automatically.

14. The method of claim 11, wherein receiving the at least a performance datum comprises detecting at least an electric vehicle angle and at least an electric vehicle angle rate.

15. The method of claim 11, wherein generating the attitude control datum comprises estimating an attitude of the electric vehicle and determining an attitude difference between the estimation and a desired attitude parameter of the electric vehicle.

16. The method of claim 15, wherein generating the attitude control datum further comprises determining a set of commands to change the attitude of the electric vehicle to match the desired attitude parameter.

17. The method of claim 11, wherein determining the actuator instruction datum further comprises using a second machine-learning model.

18. The method of claim 11, wherein determining the actuator instruction datum comprises generating individual actuator instruction sets corresponding to each actuator of the plurality of actuators.

19. The method of claim 11, wherein performing the control allocation further comprises transmitting the at least an actuator instructor datum to a corresponding set of actuators for the actuators to follow.

* * * * *